(12) United States Patent
Hamabe

(10) Patent No.: US 6,823,187 B2
(45) Date of Patent: Nov. 23, 2004

(54) ADJACENT CARRIER FREQUENCY INTERFERENCE AVOIDING METHOD FOR A MOBILE STATION

(75) Inventor: Kojiro Hamabe, Tokyo (JP)

(73) Assignee: NEC Corporation, Tokyo (JP)

(*) Notice: Subject to any disclaimer, the term of this patent is extended or adjusted under 35 U.S.C. 154(b) by 345 days.

(21) Appl. No.: 09/789,732

(22) Filed: Feb. 22, 2001

(65) Prior Publication Data

US 2001/0016499 A1 Aug. 23, 2001

(30) Foreign Application Priority Data

Feb. 23, 2000 (JP) .................................. 2000-046349

(51) Int. Cl.⁷ .................................................. H04Q 7/20
(52) U.S. Cl. ...................................................... 455/454
(58) Field of Search .......................... 455/454, 62, 67.11, 455/560, 452.1

(56) References Cited

U.S. PATENT DOCUMENTS 6,023,622 A    2/2000   Plaschke et al.

2001/0016499 A1 * 8/2001 Hamabe .................. 455/454

FOREIGN PATENT DOCUMENTS

| EP | 0 946 072 A1 | 9/1999 |
| EP | 1128573 A2 * | 8/2001 |
| JP | 9-261153 | 10/1997 |
| JP | 11-341555 | 12/1999 |

* cited by examiner

*Primary Examiner*—William Cumming
(74) *Attorney, Agent, or Firm*—McGinn & Gibb, PLLC

(57) ABSTRACT

This mobile station comprises a circuit for repeating measurement of the received power of the carrier frequencies being transmitted from the base station of 1 and/or the received power of the carrier frequencies being used by another cellular system, a circuit for reporting the result of measurement to the base station of 1, a circuit for changing the carrier frequencies for use in communication according to the notification from the base station of 1, and a circuit for changing the frequency of measurement.

23 Claims, 16 Drawing Sheets

PRIOR ART

ADJACENT CARRIER FREQUENCY INTERFERENCE AVOIDING METHOD FOR A MOBILE STATION

BACKGROUNDS OF THE INVENTION

1. Field of the Invention

The present invention relates to an adjacent carrier frequency interference avoiding method for cellular system and a mobile station. In particular, the present invention relates to an adjacent carrier frequency interference avoiding method for cellular system, by which the occurrence of interference between different sets of signals sent using adjacent carrier frequencies can be avoided, when carrier frequencies used by two separate cellular systems are adjacent to each other on the frequency axis, as well as a mobile station and a base station controller that are used therein

2. Description of the Related Art

A cellular system is generally assigned a specific frequency band, in which multiple different carrier frequencies are set. A mobile station sets a link between itself and a base station that has been set within a service area and communicates with the base station bi-directionally. A transmitter of a base station and that of a mobile station are designed so that, when a base station transmits signals to a mobile station using a certain carrier frequency, or vice versa, power leakage into the frequency band of another carrier frequency that is adjacent on the frequency axis to the carrier frequency used by the transmitter will be minimized. It is impossible, however, for the transmitter to eliminate such power leakage completely, resulting in interference wave power given to signals of an adjacent carrier frequency at a certain ratio.

Each of the mobile stations in one cellular system sets a link between itself and the nearest base station. In uplink, transmitting power from the mobile station is controlled so that the difference among the levels of reception power that the base station receives from multiple mobile stations will not be excessively large. Therefore, the power of interference between adjacent carrier frequencies that is received from signals of an adjacent carrier frequency sent from a mobile station is lower than desired wave power when it reaches the base station.

In downlink, if the level of transmitting power from base station is constant, the interference wave power from signals of a frequency that is adjacent to desired wave signals reaches the mobile station along the same propagation path as desired wave signals. During the travel, the interference wave power attenuates along with desired waves do, and thus the power of interference between adjacent carrier frequencies becomes lower than desired wave power. Therefore, such interference between adjacent carrier frequencies is not a serious problem in one cellular system.

On the other hand, interference between adjacent carrier frequencies may become a serious problem when two cellular systems are in the same service area. More specifically, a serious problem may occur if the first cellular system is assigned a frequency band adjacent to a frequency band of the second cellular system, and the first cellular sets a base station within this service area and communicates with a mobile station of the first cellular system.

This situation will be described using FIG. 1 as one example. As shown in FIG. 1, there are two cellular systems: Cellular Systems A and B. Cellular System A consists of base stations 11 through 13 and a mobile station 21; Cellular System B consists of base stations 61 through 63 and a mobile station 71. As shown in FIG. 2, Cellular System A is assigned carrier frequencies Fa1, Fa2, and Fa3 for uplink, and carrier frequencies Ga1, Ga2, and Ga3 for downlink; Cellular System B is assigned carrier frequencies Fb1, Fb2, and Fb3 for uplink and carrier frequencies Gb1, Gb2, and Gb3 for downlink. Carrier frequencies Fa3 and Ga3 of Cellular System A are adjacent to carrier frequencies Fb1 and Gb1 of Cellular System B, respectively, on the frequency axis. The mobile station 21 of Cellular System A is communicating using Fb3 for uplink and Gb3 for downlink; the mobile station 71 of Cellular System B is communicating using Fb1 for uplink, and Gb1 for downlink.

When the mobile station 21 approaches the base station 61, uplink signals of the mobile station 21 will be controlled by the base station 11 to maintain received power at a desired level. At the same time, power received by the base station 61 will grow sharply, and consequently power leakage into the carrier frequency Fb1, which is adjacent to the carrier frequency Fa3, will also become extremely high. This interference between the adjacent carrier frequencies will deteriorate the communication quality of uplink from the mobile station 71 to the base station 61. Similar deterioration in communication quality will take place along the downlink from the mobile station 21, because of an increase in adjacent carrier frequency interference from the carrier frequency Gb1, which is transmitted by the base station 61, to the carrier frequency Ga3.

One method to solve this problem is disclosed in Japanese Patent Laying-Open No. 11-341555. According to this method applied to the examples of FIGS. 1 and 2, the mobile station 21 of Cellular System A will measure the received power Qb of the carrier frequency transmitted from the base station 61 of another cellular system, i.e., Cellular System B. Higher received power Qb means that the base station 61 is nearer. Therefore, if the received power Qb is equal to or lower than a pre-determined threshold, any of the carrier frequencies will be used.

If the received power Qb is higher than the predetermined threshold, carrier frequencies Fa1 or Fa2 for uplink and carrier frequencies Ga1 or Ga2 for downlink will be used since they are not adjacent to the carrier frequencies of Cellular System B. If Fa3 or Ga3, which is adjacent to the carrier frequencies of Cellular System B, is being used, the carrier frequency will be switched to any of the other carrier frequencies.

When the mobile station 21 controls its transmitting power so that the received power of uplink signals at the base station 11 will be constant, received power, transmitting power, and power of adjacent carrier frequency interference will be in the following relationship. The smaller the received power Qa of the carrier frequency transmitted by the base station 11 of Cellular System A is, the higher the transmitting power from the mobile station 21 becomes. This in turn makes the power of interference between the adjacent carrier frequencies affecting the base station 61 greater. Therefore, another possible method is to have the mobile station 21 measure the received power Qa in addition to the received power Qb, and prevent the carrier frequencies Fa3 or Ga3 from being used if the difference between received power Qb and Qa is greater than the pre-determined threshold.

These methods can reduce interference between adjacent carrier frequencies, because they use carrier frequencies other than Fa3 and Ga3 when the mobile station 21 is likely to cause strong adjacent carrier frequency interference in the uplink from the base station 61 or when the downlink from the mobile station 21 may receive strong adjacent carrier frequency interference from the base station 61.

According to yet another method disclosed in Japanese Patent Laying-Open No. 11-341555, when the mobile station 21 is using Fa3 for uplink, it measures the received power Qb of the carrier frequency transmitted by the base station 61. If the received power Qb is higher than the pre-determined threshold, the mobile station 21 sets the maximum transmitting power for uplink to a value that is lower than the usual maximum value by a difference between the received power Qb and the pre-determined threshold. Another possible method is to have the mobile station 21 additionally measure the received power Qa of the carrier frequency transmitted by the base station 11, and reduce the setting of maximum transmitting power by a difference between the received power Qb and Qa.

These methods can reduce interference between adjacent carrier frequencies, because they reduce the maximum value of transmitting power of the mobile station 21 if the station is using Fa3 for uplink and thus is likely to cause strong adjacent carrier frequency interference in the uplink from the base station 61. These methods are effective when there are no other carrier frequencies available. In addition, since they do not switch from one carrier frequency to another, the duration of strong adjacent carrier frequency interference can be shortened by causing the affecting mobile station to reduce its transmitting power on an autonomous basis.

One problem with the conventional methods described above is that, in order to achieve satisfactory effects, a mobile station in the midst of communication needs to measure frequently the received power of a carrier frequency being used by another cellular system. This measurement is necessary because a mobile station moves while communicating. In the midst of communication, the mobile station may not be in such a state as strong adjacent carrier frequency interference with another system is expected, but may possibly approach a base station of another cellular system.

If a mobile station moves closer to a base station of another system during communication, it must switch to another carrier frequency in a short delay time. In order to do this, the mobile station is required to measure frequently during communication the received power of a carrier frequency being used by another cellular system. This may cause a problem with a mobile station that can receive only one carrier frequency. If it becomes necessary for this type of mobile station to measure the received power of a carrier frequency being used by another cellular system, the mobile station will temporarily become unable to receive signals from the base station with which it is communicating, because it must change the frequency to receive in order to conduct measurement. If the average rate of transmitting information from this type of mobile station is to be maintained at a sufficient level, the base station must increase the rate of transmission by increasing the transmitting power before and after switching to another frequency. This is likely to lead to the increased possibility of interference with other downlink channels and a decreased link capacity.

Furthermore, in the case where the fast closed-loop transmitter power control is conducted, that is, the transmitting power from a mobile station is updated in short cycles via control signals from a base station, the signal power of uplink channels may become inadequate or otherwise excessive because of such interruption of control. This may cause deterioration in communication quality or a decrease in link capacity as a result of increased interference. In addition, power consumption by a mobile station will increase because it must conduct measurement.

SUMMARY OF THE INVENTION

An object of the present invention is to resolve the problems described above and provide an adjacent carrier frequency interference avoiding method for cellular system that requires a mobile station to measure less frequently the received power of a carrier frequency being used by another cellular system infrequently, as well as a mobile station and a base station controller that are used therein.

According to the first aspect of the invention, a cellular system comprising at least one base station and at least one mobile station, its adjacent carrier frequency interference avoiding method for use when the cellular system is located in the service area of another cellular system which uses a frequency band adjacent on the frequency axis to the frequency band being used by the cellular system, comprises the mobile station repeating measurement of the received power of the carrier frequencies being transmitted from the base station of 1 between which and the mobile station a link is set and/or the received power of the carrier frequencies being used by the another cellular system, assigning carrier frequencies that are not adjacent on the frequency axis to the carrier frequencies being used by the another cellular system to the mobile station according to the results of the measurement, and changing the frequency of the measurement according to the results of the measurement.

In the preferred construction, the adjacent carrier frequency interference avoiding method for cellular system comprising assigning to the mobile station carrier frequencies that are not adjacent on the frequency axis to the carrier frequencies of the another cellular system if the difference between received power being transmitted from the base station of 1 and the received power of the carrier frequencies of the another cellular system is greater than the first threshold.

In another preferred construction, the adjacent carrier frequency interference avoiding method for cellular system comprises changing the frequency of the measurement if the difference between received power being transmitted from the base station of 1 and the received power of the carrier frequencies of the another cellular system is greater than the second threshold.

According to the second aspect of the invention, a cellular system comprising at least one base station and at least one mobile station, its adjacent carrier frequency interference avoiding method for use when the cellular system is located in the service area of another cellular system which uses a frequency band adjacent on the frequency axis to the frequency band being used by the cellular system, comprises the mobile station repeating measurement of the received power of the carrier frequencies being transmitted from the base station of 1 between which and the mobile station a link is set and/or the received power of the carrier frequencies being used by the another cellular system, updating the maximum power from the mobile station according to the results of the measurement, and changing the frequency of the measurement according to the results of the measurement.

In the preferred construction, the adjacent carrier frequency interference avoiding method for cellular system comprises updating the maximum power from the mobile station if the difference between received power being transmitted from the base station of 1 and the received power of the carrier frequencies of the another cellular system is greater than the first threshold.

In another preferred construction, the adjacent carrier frequency interference avoiding method for cellular system comprises changing the frequency of the measurement if the difference between received power being transmitted from the base station of 1 and the received power of the carrier frequencies of the another cellular system is greater than the second threshold.

According to the third aspect of the invention, a mobile station in a cellular system which comprises at least one base station and at least one mobile station including the claimed mobile station, the mobile station constituting a cellular system located in the service area of another cellular system which uses a frequency band adjacent on the frequency axis to the frequency band being used by the cellular system, comprises means for repeating measurement of the received power of the carrier frequencies being transmitted from the base station of 1 and/or the received power of the carrier frequencies being used by the another cellular system, means for reporting information on the results of the measurement to the base station of 1, means for changing the carrier frequencies used for communication according to the notification from the base station of 1, and means for changing the frequency of the measurement.

In the preferred construction, the frequency changing means changes the frequency of measurement according to the results of measurement by the measuring means.

In another preferred construction, the frequency changing means changes the frequency of measurement according to the notification from the base station of 1.

In another preferred construction, the frequency changing means assigns carrier frequencies that are not adjacent on the frequency axis to the carrier frequencies being used by the another cellular system to the mobile station if the difference between received power being transmitted from the base station of 1 and the received power of the carrier frequencies of the another cellular system is greater than the first threshold.

In another preferred construction, the measurement frequency changing means changes the frequency of the measurement if the difference between received power being transmitted from the base station of 1 and the received power of the carrier frequencies of the another cellular system is greater than the second threshold.

According to the fourth aspect of the invention, a mobile station in a cellular system which comprises at least one base station and at least one mobile station including the claimed mobile station, the mobile station constituting a cellular system located in the service area of another cellular system which uses a frequency band adjacent on the frequency axis to the frequency band being used by the cellular system, comprises means for repeating measurement of the received power of the carrier frequencies being transmitted from the base station of 1 and/or the received power of the carrier frequencies being used by the another cellular system, means for changing the maximum transmitting power according to the results of measurement, and means for changing the frequency of measurement.

In the preferred construction, the frequency changing means changes the frequency of measurement according to the results of measurement by the measuring means.

In another preferred construction, he mobile station comprises means for reporting information on the results of the measurement to the base station of 1, and the frequency changing means changes the frequency of measurement according to the notification from the base station of 1.

In another preferred construction, the maximum power updating means changes the frequency of the measurement if the difference between received power being transmitted from the base station of 1 and the received power of the carrier frequencies of the another cellular system is greater than the first threshold.

In another preferred construction, the measurement frequency changing means changes the frequency of the measurement if the difference between received power being transmitted from the base station of 1 and the received power of the carrier frequencies of the another cellular system is greater than the second threshold.

According to another aspect of the invention, a mobile station in a cellular system which comprises at least one base station and at least one mobile station including such mobile station, the mobile station constituting a cellular system located in the service area of another cellular system which uses a frequency band adjacent on the frequency axis to the frequency band being used by the cellular system, comprises means for repeating measurement of the received power of the carrier frequencies being transmitted from the base station of 1 and/or the received power of the carrier frequencies being used by the another cellular system, means for reporting information on the results of the measurement to the base station of 1, and means for changing the maximum transmitting power according to the notification from the base station of 1, and means for changing the frequency of the measurement.

In the preferred construction, the frequency changing means changes the frequency of measurement according to the results of measurement by the measuring means.

In another preferred construction, the frequency changing means changes the frequency of measurement according to the notification from the base station of 1.

In another preferred construction, the maximum power updating means changes the frequency of the measurement if the difference between received power being transmitted from the base station of 1 and the received power of the carrier frequencies of the another cellular system is greater than the first threshold.

In another preferred construction, the measurement frequency changing means changes the frequency of the measurement if the difference between received power being transmitted from the base station of 1 and the received power of the carrier frequencies of the another cellular system is greater than the second threshold.

According to a further aspect of the invention, a base station controller in a cellular system which comprises at least one base station and at least one mobile station including the claimed mobile station, the mobile station being for use in a cellular system located in the service area of another cellular system which uses a frequency band adjacent on the frequency axis to the frequency band being used by the cellular system, comprises means for receiving a notification of information from the mobile station concerning the received power at the mobile station of the carrier frequency being transmitting from a base station of 1 and/or the received power at the mobile station of the carrier frequency being used by another cellular system, means for changing the measuring frequency for the received power at the mobile station according to the notification of information from the mobile station concerning the received power in the mobile station of the carrier frequency being transmitting from a base station of 1 and/or the received power in the mobile station of the carrier frequency being used by another cellular system, and means for transmitting the measuring frequency to the mobile station.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In all of the embodiments, a transmitter included in the base station or the mobile station is configured so that the interference wave power leaking from a carrier frequency set in the transmitter into an adjacent carrier frequency will represent a ratio equal to or less than a pre-determined value to the power radiated from the interfering carrier frequency.

First Embodiment

Figure 1:
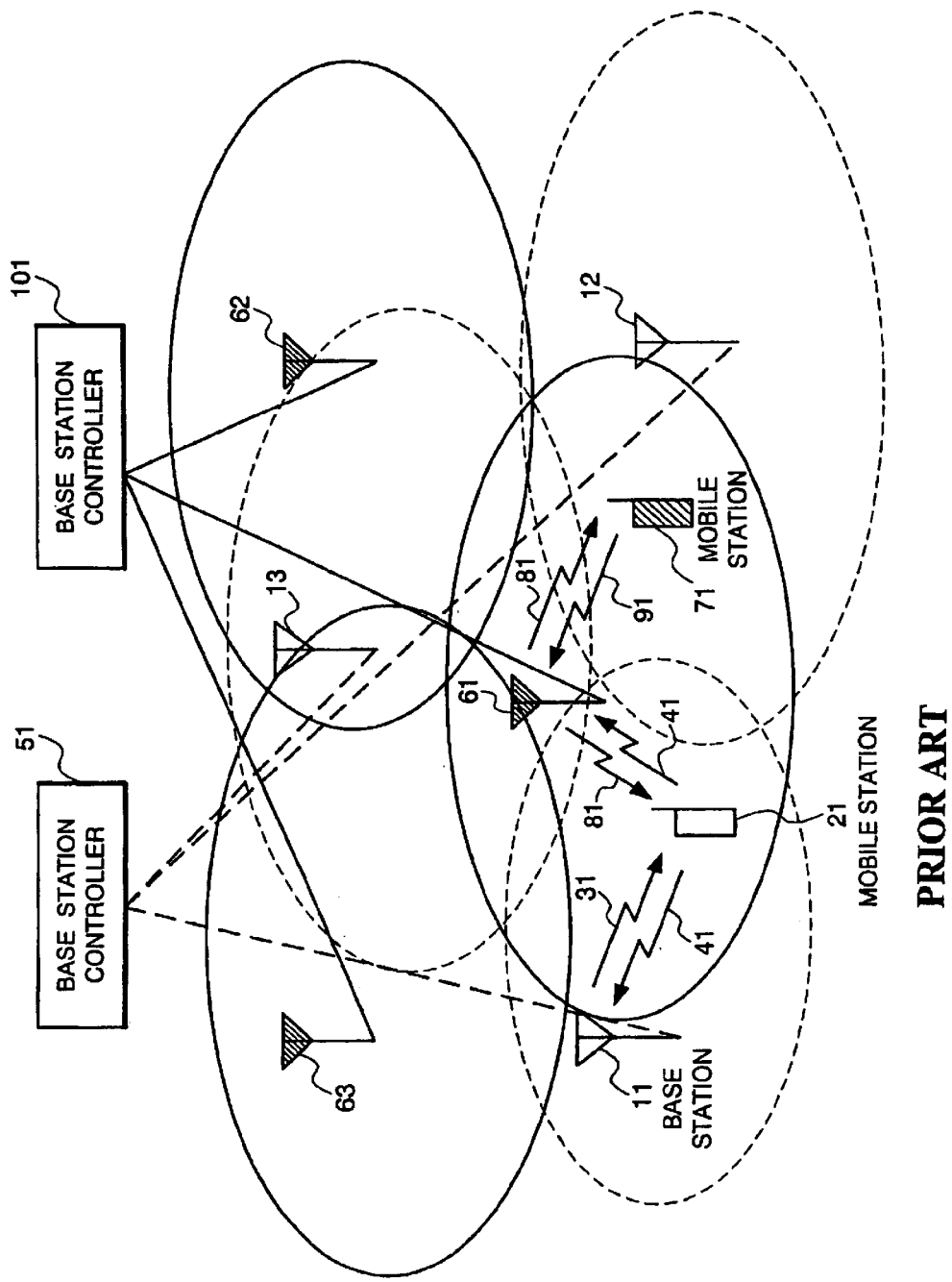
FIG. 1 is a block diagram showing the topology of a cellular system to which an embodiment of the present invention is applied.

FIG. 1 is a block diagram showing the topology of a cellular system to which the adjacent carrier frequency interference avoiding method according to one embodiment of the present invention is applied.

The adjacent carrier frequency interference avoiding method for cellular system of the first embodiment is applied to a cellular system of the topology shown in FIG. 1. The cellular system of FIG. 1 has base stations 11 through 13 in its service area; a mobile station 21 is located within the cell of the base station 11. The base stations 11 through 13 are connected to a base station controller 51, respectively; the base station controller 51 is in turn connected to another communication network (not shown) to which another base station controller is connected. This cellular system, not shown herein, has a number of other base stations, and a number of mobile stations are located within each cell. This cellular system will be referred to as "Cellular System A."

Another cellular system is located within the same service area, this cellular system having base stations 61 through 63 installed. A mobile station 71 is located in this service area. The base stations 61 through 63 are connected to a base station controller 101, respectively; the base station controller 101 is in turn connected to another communication network (not shown) to which another base station controller is connected. This cellular system, not shown herein, has a number of other base stations, and a number of mobile stations are located within each cell. This cellular system will be referred to as "Cellular System B." The communication network of Cellular System B is connected to the communication network of Cellular System A.

The two cellular systems employ the CDMA (Code Division Multiple Access) for radio access technology. Under the CDMA system, one carrier frequency is multiplexed into multiple channels by assigning different signs to different channels, thereby enabling use of one carrier frequency for communication among multiple base stations and multiple mobile stations. Since different signs are used for different base stations, all the base stations can use each of the carrier frequencies assigned to each cellular system, simultaneously.

Figure 2:
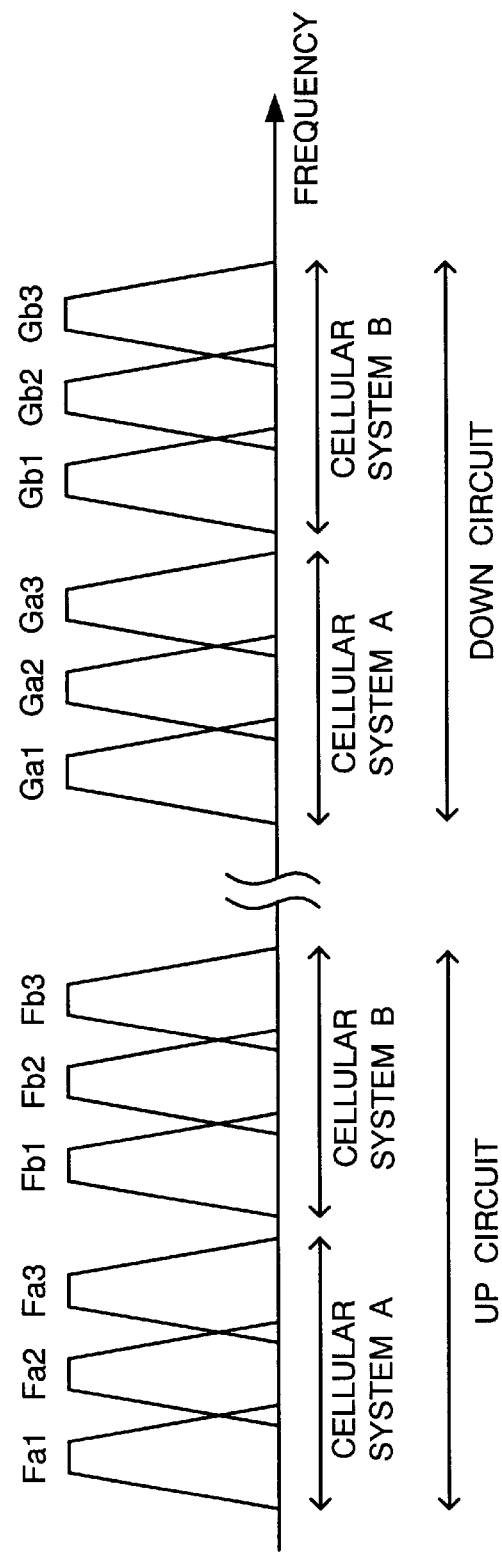
FIG. 2 is a diagram showing the arrangement of carrier frequencies of a cellular system to which an embodiment of the present invention is applied.

FIG. 2 shows the arrangement of carrier frequencies on the frequency axis. The base stations 11 through 13 of Cellular System A are assigned carrier frequencies Fa1 through Fa3 for uplink, and carrier frequencies Ga1 through Ga3 for downlink. The base stations 61 through 63 of Cellular System B are assigned carrier frequencies Fb1 through Fb3 for uplink, and carrier frequencies Gb1 through Gb3 for downlink.

The carrier frequency Fa3 for uplink of Cellular System A and the carrier frequency Fb1 for uplink of Cellular System B are adjacent to each other on the frequency axis. The carrier frequency Ga3 for downlink of Cellular System A and the carrier frequency Gb1 for downlink of Cellular System B are adjacent to each other on the frequency axis.

Figure 3:
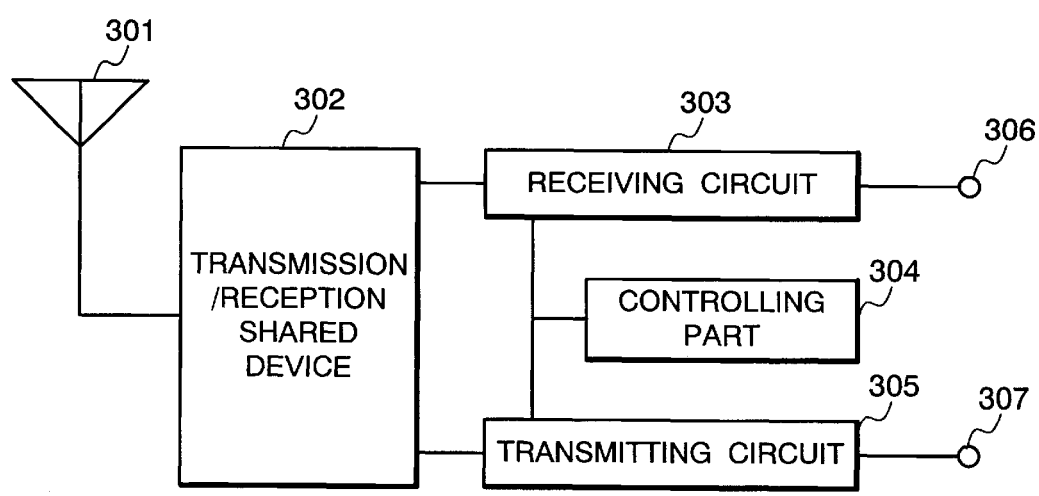
FIG. 3 is a block diagram showing the configuration of a mobile station according to an embodiment of the present invention.

FIG. 3 is a block diagram showing the configuration of a mobile station of the first embodiment. The mobile station of FIG. 3 comprises an antenna 301, a transmission/reception shared device 302, a receiving circuit 303, a controlling part 304, a transmitting circuit 305, a receiving circuit terminal 306, and a transmitting circuit terminal 307. Both the mobile station 21 and the mobile station 71 are configures as shown in FIG. 3.

The mobile station receives the downlink signals transmitted by the base station in its receiving circuit 303, via the antenna 301 and the transmission/reception shared device 302. When the mobile station communicates by setting a channel between itself and the base station, the receiving circuit 303 uses the sign for that channel to fetch and receive the signals of the set channel, among all the signals through the channels that have been multiplexed in the same carrier frequency being used and interference signals arriving from other base stations. Signals sent through a channel include user information mainly consisting of voice and data and control information used for changing carrier frequencies or signs.

Among all the signals through the channel, the receiving circuit 303 outputs user information to the receiving circuit terminal 306 and sends control information to the controlling part 304. In addition, the receiving circuit 303 measures the power within the frequency band of a carrier frequency being used for downlink. It also temporarily changes the frequency that it receives to measure the power within the frequency band of another carrier frequency. The receiving circuit 303 then sends the measurement of received power to the controlling part 304.

Based on the control information sent from the receiving circuit 303, the controlling part 304 designates a carrier frequency and a channel sign to be set in the receiving circuit 303 and the transmitting circuit 305 by these circuits, respectively. Furthermore, based on the measurement of received power sent from the receiving circuit 303, the controlling part 304 generates information to notify the base station controller and sends it to the transmitting circuit 305. Based on the control information sent from the receiving circuit 303, the controlling part 304 updates the transmitting power and notifies the new value to the transmitting circuit 305.

The transmitting circuit 305 generates signals to be transmitted, using the information sent from the controlling part 304 for notification to the base station controller and the user information, i.e., uplink signals, that has been sent from the transmitting circuit terminal 307. It then transmits these signals to the base station, via the transmission/reception shared device 302 and the antenna 301, at the level of transmitting power notified by the controlling part 304.

Figure 16:
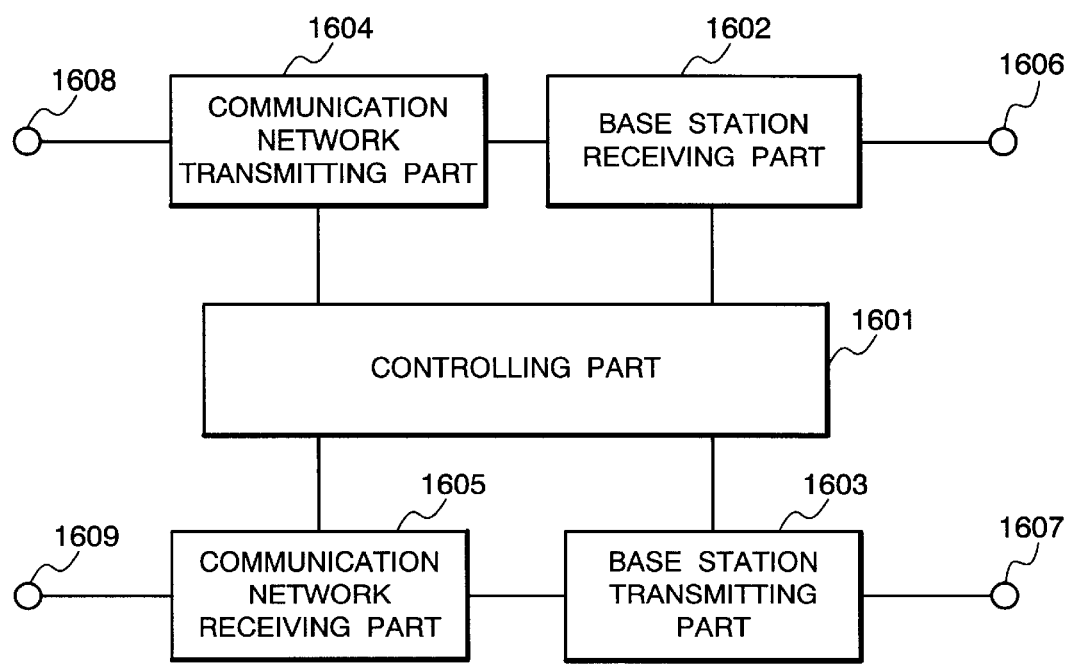
FIG. 16 is a block diagram showing the configuration of a base station controller according to an embodiment of the present invention.

FIG. 16 is a block diagram showing the configuration of a base station controller according to the first embodiment of the present invention. The base station controller of FIG. 16 comprises a controlling part 1601, a base station receiving part 1602, a base station transmitting part 1603, a communication network transmitting part 1604, a communication network receiving part 1605, a base station receiving terminal 1606, a base station transmitting terminal 1607, a communication network transmitting terminal 1608, and a communication network receiving terminal 1609. The base station controller 51 is configured as shown in FIG. 16.

In the base station controller, the base station receiving part 1602 receives control information from a base station and sends it to the controlling part 1601. The communication network receiving part 1605 receives control information from another base station controller and sends it to the controlling part 1601. Based on these sets of control information, the controlling part 1601 generates the control information to be notified to the base station and sends it to the base station transmitting part 1603. It also generates the control information to be notified to the other base station and sends it to the communication network transmitting part 1604. The base station transmitting part 1603 in turn sends the control information sent from the controlling part 1601 to the base station. The communication network transmitting part 1604 sends the control information sent from the controlling part 1601 to the communication network.

The mobile station 21 sets a base station 11 and two circuits; the downlink channel 31 is used for transmission from the base station 11 to the mobile station 21, and the uplink channel 41 is used for transmission from the mobile station 21 to the base station 11. Meanwhile, a mobile station 71 sets a channel 81 for downlink and a channel 91 for uplink between itself and a base station 61, and communicates with the base station 61.

The base station 11 measures the ratio between the desired wave power and the interference wave power along the uplink channel 41 from the mobile station 21, and compares the measured ratio with a pre-determined target value. Base on the results of the comparison, the base station 11 directs the mobile station to increase or decrease its transmitting power so that the resulting ratio will be as close to the target value as possible. Using the similar approach, the base station 61 ensures that the ratio between the desired wave power and the interference wave power along the uplink channel 91 of the mobile station 21 will be as close to the target value as possible.

The mobile station 21 measures the received power Qa of the downlink carrier frequency from a near-by base station belonging to Cellular System A. It also measures the received power Qb of the downlink carrier frequency from a base station belonging to Cellular System B.

The base station controller 51 of Cellular System A acquires information on the mean frequency of downlink carrier frequencies Gb1 through Gb3 of Cellular System B, via the communication network to which the base station controller 101 of Cellular System B is connected. The base station controller 51 then informs the acquired information, using the base stations 11 through 13. From the information informed by the base stations 11 through 13, the mobile station 21 can identify the downlink carrier frequencies Gb1 through Gb3 of Cellular System B.

During communication, the mobile station 21 usually receives signals continuously along the downlink channel. However, if the necessity arises to measure the received power of a different carrier frequency, the base station will increase temporarily the rate of transmitting information along the downlink channel so that the required amount of information can be sent in a shorter time. This will create a blank period, i.e., no transmission period, while ensuring that the average rate of transmitting information will be maintained at an appropriate level. Using this blank period thus created, the mobile station 21 will change the frequency to receive, and measure the received power of the carrier frequency being used by the base stations 61 through 63 of Cellular System B for transmission.

The base station controller 51 determines a carrier frequency to use when setting a channel between the base station 11 and the mobile station 21. If it uses Fa1 or Fa2 as uplink carrier frequency and Ga1 or Ga2 as downlink carrier frequency, adjacent carrier frequency interference with Cellular System B is unlikely to be a serious problem. Therefore, the present embodiment addresses cases where the base station 11 and the mobile station 21 start communication by using Fa3 as uplink carrier frequency and Ga3 as downlink carrier frequency. Between the base station 61 and the mobile station 71 of Cellular System B, it will be assumed that Fb1 is used as uplink carrier frequency and Gb1 as downlink carrier frequency.

It will further be assumed that the base station controller 51 has informed the mean frequency of downlink carrier frequencies Gb1, Gb2, and Gb3 of Cellular System B, using the common control channel shared by the base stations 11, 12, and 13. Before the start of communication, the mobile station 21 receives the information thus informed from the base station 11.

The base station controller 51 assigns to the mobile station 21 a carrier frequency that is not adjacent to the carrier frequencies of Cellular System B, based on the measurement information on the received power Qa and/or Qb sent from the mobile station 21. More specifically, there are two approaches to this assignment. One approach assigns a carrier frequency that is not adjacent to the carrier frequencies of Cellular System B if the received power Qb is higher than the pre-determined threshold. The other approach assigns a carrier frequency that is not adjacent to the carrier frequencies of Cellular System B if the difference between the received power Qb and the received Power Qa is greater than the pre-determined threshold.

The present embodiment employs the second approach. That is, if the difference between the received power Qb and the received Power Qa is greater than the pre-determined threshold while Cellular System A is using a carrier frequency that is adjacent to the carrier frequencies of Cellular System B, then the present embodiment determines that the carrier frequency must be changed in order to avoid adjacent frequency interference and assigns a carrier frequency that is not adjacent to the carrier frequencies of Cellular System B.

The base station controller 51 assigns a carrier frequency to the mobile station 21, based on the measurement information on the received power Qa and/or Qb sent from the mobile station 21, as stated above. The mobile station 21, therefore, needs to inform the measurement information it has obtained to the base station controller 51. In one approach, the mobile station 21 informs the measurements of the received power Qa and/or the received power Qb. Another approach relates to cases where the carrier frequency is changed on condition that the difference between the received power Qb and the received power Qa is greater than the pre-determined threshold; in such cases, the information to be sent by the mobile station 21 should contain the difference between the received power Qb and the received power Qa.

Yet another approach relates to cases where the mobile station 21 determines that the condition for changing the carrier frequency in order to avoid adjacent channel interference is satisfied; in such cases, the information to be sent by the mobile station 21 should contain the results of this determination. The present embodiment employs the last approach, in which the mobile station 21 informs that the condition for changing the carrier frequency has been satisfied.

The operation of the mobile station 21 and the base station controller 51, which employ the adjacent carrier frequency interference avoiding method of the present embodiment, will now be described with reference to FIGS. 4 and 5.

Figure 4:
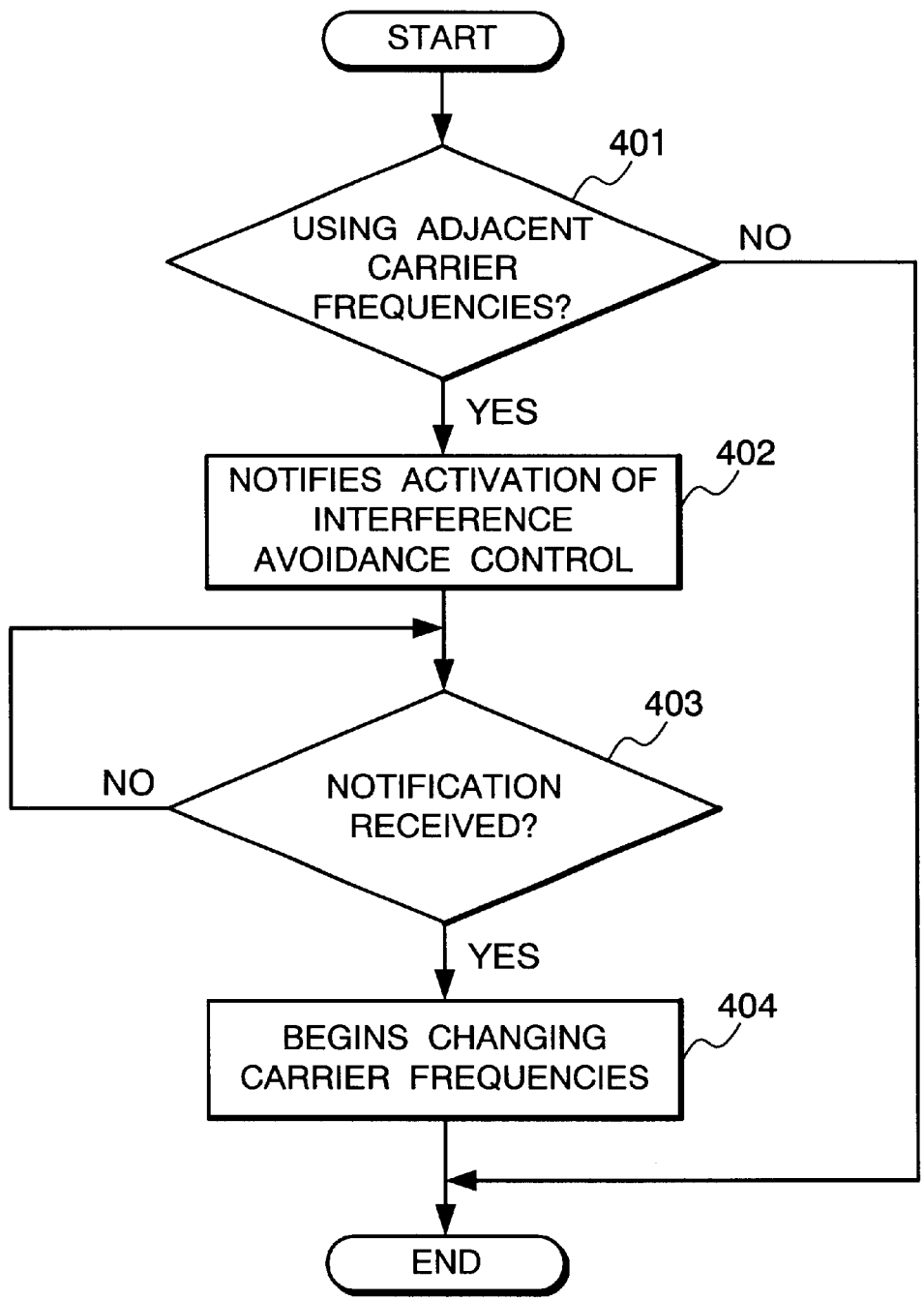
FIG. 4 is a flow chart showing the operation of a base station controller according to the first embodiment.
Figure 5:
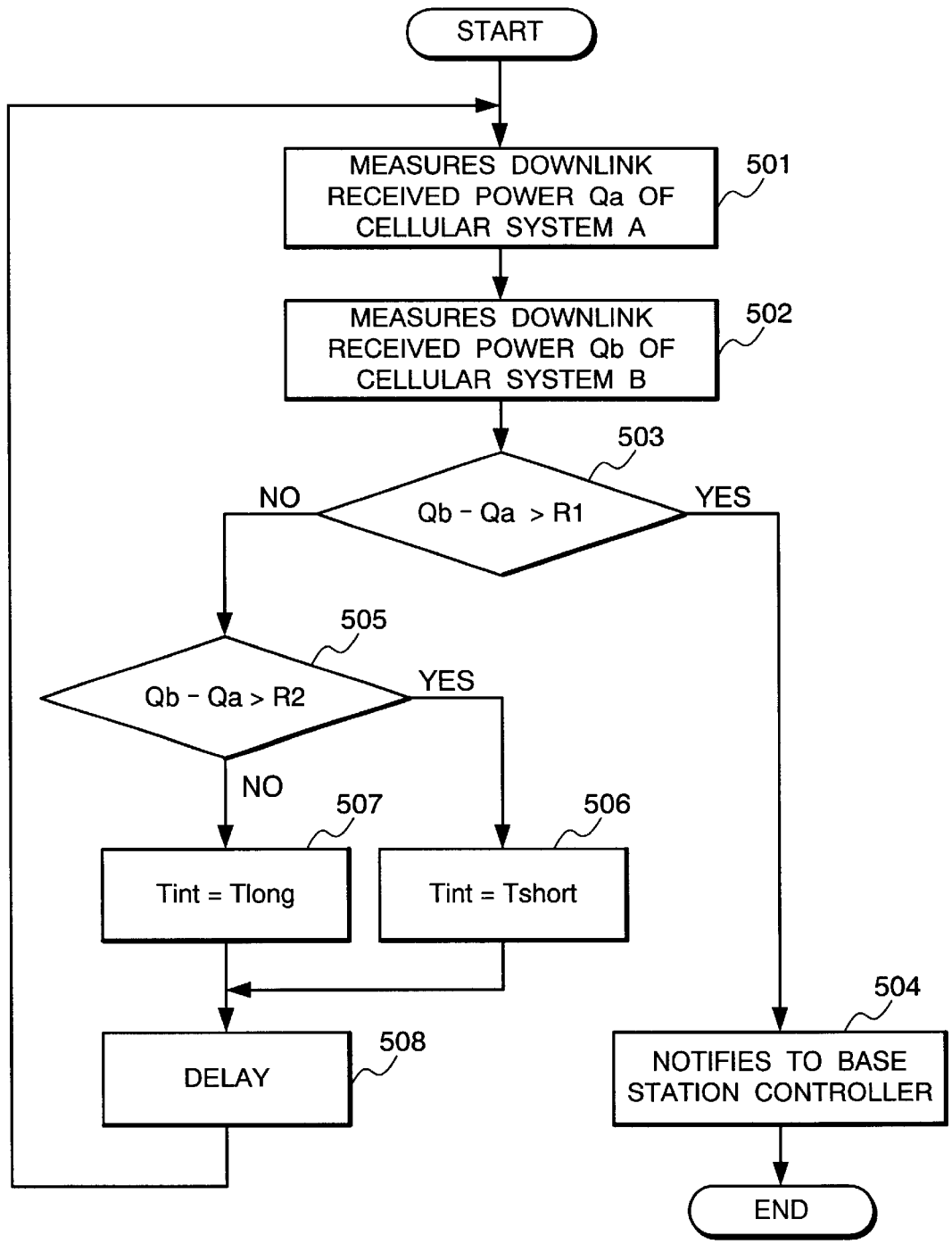
FIG. 5 is a flow chart showing the operation of a mobile station according to the first embodiment.

FIG. 4 is a flow chart showing the operation of the base station controller 51 when performing control for avoiding interference. FIG. 5 is a flow chart showing the operation of the mobile station 21 when performing interference avoidance control. The descriptions of all the embodiments below represent the values of transmitting power and received power in decibels. Also note that, in all the embodiments below, communication between the base station controller 51 and the mobile station 21 is conducted via the base station 11.

The operation of the base station controller 51 will first be described with reference to FIG. 4. After determining the carrier frequency to be used by the mobile station 21 and starting communication, the base station controller 51 checks whether the carrier frequency is adjacent to the carrier frequencies of Cellular System B or not (Step 401). If not, it terminates without performing interference avoidance control.

If it finds that the carrier frequency being used by the mobile station 21 is adjacent to the carrier frequencies of Cellular System B, then the base station controller 51 notifies the mobile station 21 that interference avoidance control has been activated (Step 402). Along with this information, the base station controller 51 notifies the thresholds R1 and R2 to be used by the mobile station for interference avoidance control, and the measuring cycles Tshort and Tlong.

When it starts interference avoidance control and determines that the carrier frequency must be changed for avoiding interference, the mobile station 21 notifies the base station controller 51 of the fact. Receiving this notification (Step 403), the base station controller 51 begins the process of changing the carrier frequency (Step 404). It selects either Fa1 or Fa2 as uplink carrier frequency and either Ga1 or Ga2 as downlink carrier frequency, which are not adjacent to the carrier frequencies of Cellular System B. The base station controller 51 then changes the carrier frequency to the selected carrier frequency.

Next, the operation of the mobile station 21 will be described with reference to FIG. 5. Upon receiving a notification of the activation of interference avoidance control from the base station controller 51, the controlling part 304 of the mobile station 21 begins the process of interference avoidance control, as described below.

Using the receiving circuit 303, the mobile station 21 measures the downlink received power Qa of Cellular System A (Step 501). The mobile station 21 is using the carrier frequency Ga3 for downlink, so it measures the power within that frequency band. The mobile station 21 also uses the receiving circuit 303 to measure the downlink received power Qb of Cellular System B (Step 502).

Since it has information concerning the mean frequency of the downlink carrier frequency Gb1 of Cellular System B, the mobile station 21 changes temporarily the frequency that it receives in order to measure the power within the frequency band associated with the carrier frequency Gb1. If, in Step 503, it finds that the difference between the received power Qb and the received power Qa is greater than the predetermined threshold R1, the mobile station 21 determines that the carrier frequency must be changed. It then generates control information to notify that the condition for changing the carrier frequency has been satisfied, and transmits the control information to the base station 11, using the transmitting circuit 305. The base station 11 in turn notifies the same control information to the base station controller 51 (Step 504).

If, in Step 503, it finds that the difference between the received power Qb and the received power Qa is equal to or smaller than the pre-determined threshold R1, the mobile station 21 proceeds to Step 505. If it finds that the difference between the received power Qb and the received power Qa is greater than the predetermined threshold R2, the mobile station 21 sets Tint, the measuring cycle for the received power Qa and Qb, to Tshort, the short measuring cycle (Step 506). Otherwise it sets Tint, the measuring cycle, to Tlong, the measuring cycle longer than Tshort (Step 507). After the elapse of the delay time for the measuring cycle Tint (Step 508), the mobile station 21 repeats the same procedure, beginning with Step 501.

The threshold R1 to be used in the process of interference avoidance control described above should be equal to a value obtained by subtracting a predetermined margin from the difference between the transmitting power within the frequency band of the carrier frequency set for use by the mobile station 21 for transmission and the portion of such transmitting power that leaks into the frequency band of the adjacent carrier frequency. The value of the threshold R2 should be smaller than R1.

According to the present embodiment, a longer measuring cycle, Tlong, is used when the difference between the received power Qb and the received power Qa is equal to or smaller than the threshold R2. Thus, the measuring frequency is lower in comparison to when the shorter measuring cycle, Tshort, is used throughout the process. While Tlong is being used, the difference between the received power Qb and the received power Qa is even smaller than the threshold R2, which is set to a smaller value than the threshold R1. This further means that the probability that the difference between the received power Qb and the received power Qa exceeds the threshold R1 can be maintained at a low level, even if the mobile station moves while the measuring cycle Tlong is being used.

On the other hand, the measuring cycle is set to a shorter value, Tshort, when the difference between the received power Qb and the received power Qa is greater than the threshold R2. This means that the probability that the difference between the received power Qb and the received power Qa exceeds the threshold R1 can also be maintained at a low level while this measuring cycle is being used. Thus, the present embodiment can lower the average measuring frequency, while reducing the probability that the difference between the received power Qb and the received power Qa may exceed the threshold R1.

Second Embodiment

The second embodiment of the present invention will now be described with reference to the drawings. As with the first embodiment, the adjacent carrier frequency interference avoiding method for cellular system of the second embodiment cellular systems is configured as shown in FIG. 1. This embodiment is applied to cellular systems using THE CDMA (Code Division Multiple Access) for radio access technology. FIG. 2 shows the arrangement of carrier frequencies on the frequency axis. The arrangement of carrier frequencies assigned to each cellular system is also the same as the first embodiment.

The mobile station of the second embodiment is configured as shown in FIG. 3, similarly to the first embodiment. Its operation is the same as the mobile station of the first embodiment, except for the controlling part 304. The base station controller of the second embodiment is configured as shown in FIG. 16, also similarly to the first embodiment. Its operation is the same as the base station controller of the first embodiment, except for the controlling part 1601.

Similarly to the first embodiment, the mobile station 21 measures the received power Qa of the downlink carrier frequency from a near-by base station belonging to Cellular System A. It also measures the received power Qb of the downlink carrier frequency from a base station belonging to Cellular System B.

In the second embodiment as well, the base station 11 and the mobile station 21 start communication by using Fa3 as uplink carrier frequency and Ga3 as downlink carrier frequency. Between the base station 61 and the mobile station 71 of Cellular System B, it will be assumed that Fb1 is used as uplink carrier frequency and Gb1 as downlink carrier frequency.

Similarly to the first embodiment, the second embodiment employs the following frequency assignment method for Cellular System A. That is, if the difference between the received power Qb and the received Power Qa is greater than the pre-determined threshold while Cellular System A is using a carrier frequency that is adjacent to the carrier frequencies of Cellular System B, then the second embodiment determines that the carrier frequency must be changed in order to avoid adjacent frequency interference and assigns a carrier frequency that is not adjacent to the carrier frequencies of Cellular System B.

The base station controller 51 uses the measurement information on the received power Qa and/or Qb sent from the mobile station 21 to assign a carrier frequency to the mobile station 21. The mobile station 21, therefore, must inform the measurement information it has obtained to the base station controller 51. Among several approaches, the second embodiment employs the approach in which the mobile station 21 informs the measurements of the received power Qa and/or the received power Qb.

The operation of the mobile station 21 and the base station controller 51, which employ the adjacent carrier frequency interference avoiding method of the second embodiment will now be described with reference to FIGS. 6 and 7.

Figure 6:
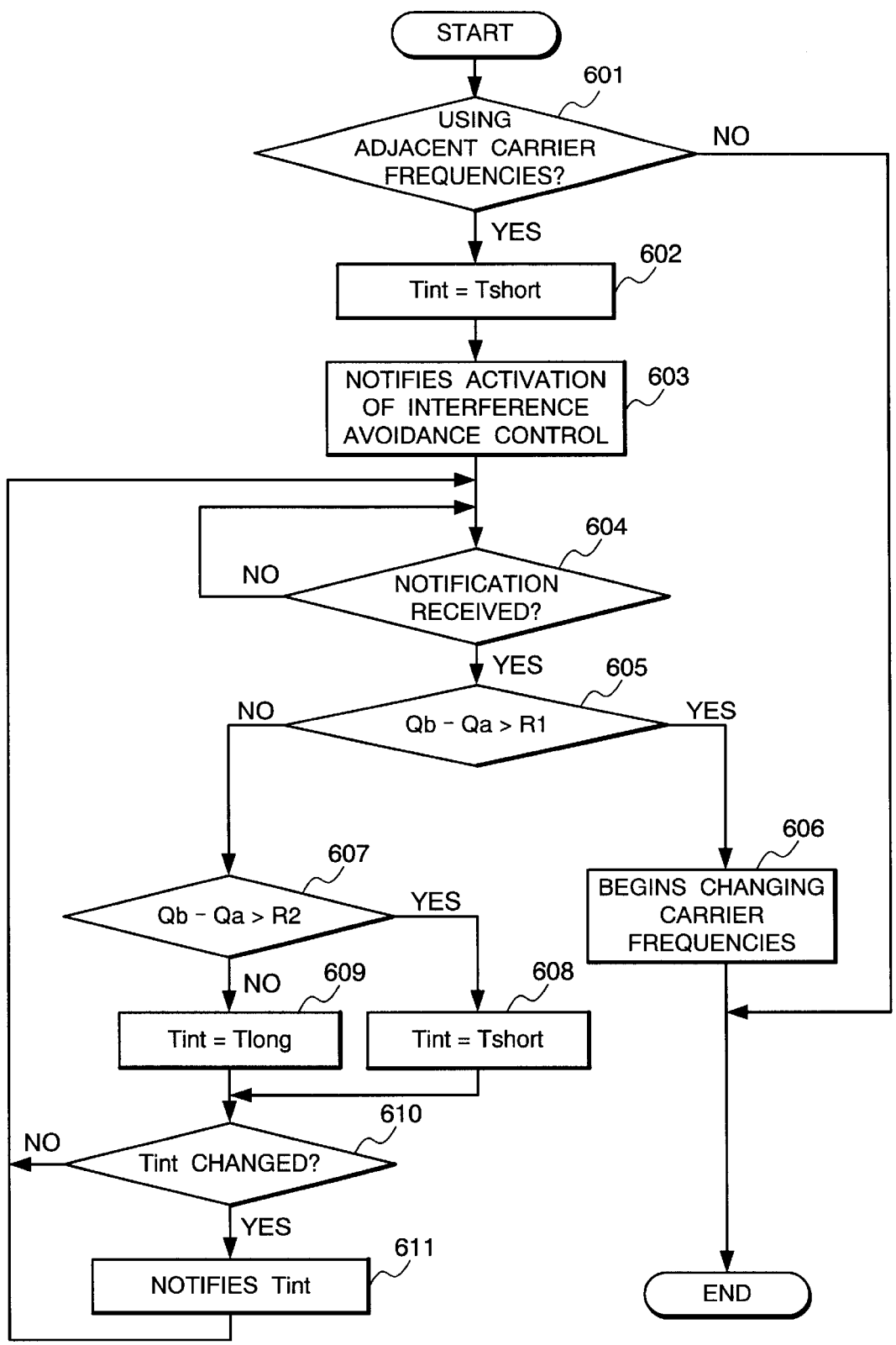
FIG. 6 is a flow chart showing the operation of a base station controller according to the second embodiment.
Figure 7:
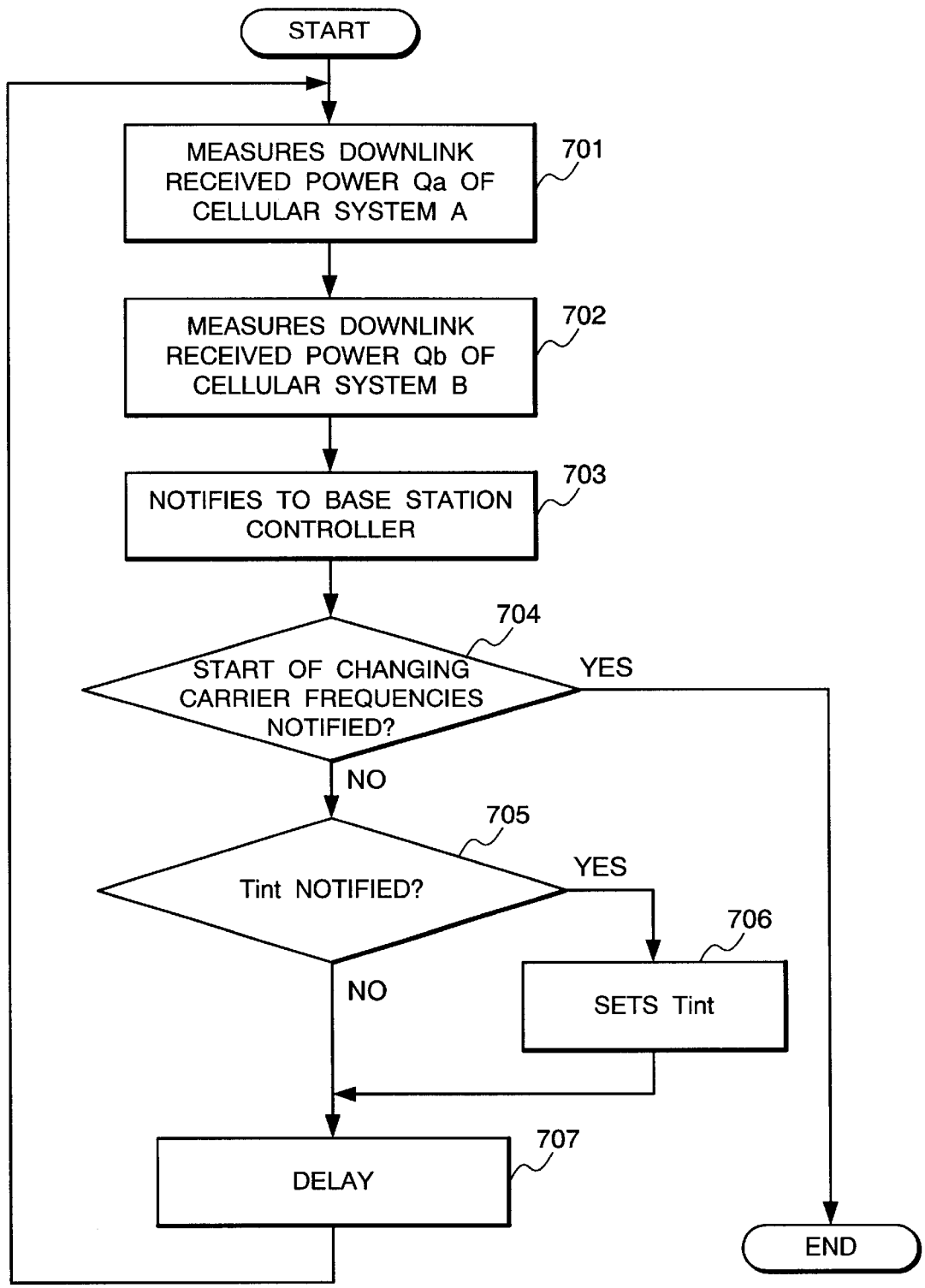
FIG. 7 is a flow chart showing the operation of a mobile station according to the second embodiment.

FIG. 6 is a flow chart showing the operation of the base station controller 51 when performing control for avoiding interference. FIG. 7 is a flow chart showing the operation of the mobile station 21 when performing control for avoiding interference.

The operation of the base station controller 51 will first be described with reference to FIG. 6. After determining the carrier frequency to be used by the mobile station 21 and starting communication, the base station controller 51 checks whether the carrier frequency is adjacent to the carrier frequencies of Cellular System B or not (Step 601). If not, it terminates without performing interference avoidance control.

If it finds that the carrier frequency being used by the mobile station 21 is adjacent to the carrier frequencies of Cellular System B, then the base station controller 51 sets Tint, the cycle for measuring the received power of the carrier frequency of the downlink from the mobile station for interference avoidance control, to Tshort, the short measuring cycle (Step 602). The base station controller 51 then notifies the mobile station 21 that interference avoidance control has been activated, together with the information on the measuring cycle Tint (Step 603).

After it starts interference avoidance control, the mobile station 21 measures the downlink received power Qa of Cellular System A and the downlink received power Qb of Cellular System B, and notifies the resulting measurements to the base station controller 51. Upon receiving the notification (Step 604), the base station controller 51 proceeds to Step 605.

If, in Step 605, it finds that the difference between the received power Qb and the received power Qa is greater than the pre-determined threshold R1, the base station controller 51 determines that the carrier frequency must be changed, and begins the process of changing the carrier frequency (Step 606). It selects either Fa1 or Fa2 as uplink carrier frequency and either Ga1 or Ga2 as downlink carrier frequency, which are not adjacent to the carrier frequencies of Cellular System B. The base station controller 51 then notifies the selection to the mobile station 21, which will change the carrier frequency to the selected carrier frequency.

If, in Step 605, it finds that the difference between the received power Qb and the received power Qa is equal to or smaller than the pre-determined threshold R1, the base station controller 51 proceeds to Step 607. If it finds that the difference between the received power Qb and the received power Qa is greater than the pre-determined threshold R2, the base station controller 51 sets Tint, the measuring cycle for the received power Qa and Qb, to Tshort, the short measuring cycle (Step 608). Otherwise it sets the measuring cycle Tint to Tlong, the measuring cycle longer than Tshort (Step 609).

If the control cycle Tint has been changed in Step 608 or 609, the base station controller 51 notifies the new control cycle Tint to the mobile station 21 (Step 611), and repeats the procedure from Step 604. Otherwise, it repeats the procedure from Step 604 without notifying the control cycle Tint.

The thresholds R1 and R2 for use in the process of interference avoidance control described above are set in a manner similar to the first embodiment.

Next, the operation of the mobile station 21 will be described with reference to FIG. 7. Upon receiving a notification of the activation of interference avoidance control from the base station controller 51, the mobile station 21 sets the measuring cycle Tint to the value designated in the notification. The controlling part 304 of the mobile station 21 begins the process of interference avoidance control, as described below.

Using the receiving circuit 303, the mobile station 21 measures the received power Qa of the carrier frequency Ga3 of Cellular System A (Step 701). The mobile station 21 also uses the receiving circuit 303 to measure the received power Qb of the carrier frequency Gb1 of Cellular System B (Step 702). It then generates control information to notify the measurements of the received power Qa and Qb, and uses the transmitting circuit 305 to transmit the control information to the base station 11. The base station 11 in turn notifies the same control information to the base station controller 51 (Step 703). If a notification to start the process of changing the carrier frequency is received from the base station controller 51 in Step 704, the mobile station 21 begins controlling the process of changing the carrier frequency. Otherwise, the mobile station 21 further checks for a notification of the control cycle Tint (Step 705). If there is one, it sets the control cycle Tint to the value designated in the notification (Step 706). After the elapse of the delay time for the control cycle Tint (Step 707), the mobile station 21 repeats the same procedure, beginning with Step 701.

In the present embodiment, similarly to the first embodiment, a longer measuring cycle, Tlong, is used when the difference between the received power Qb and the received power Qa is equal to or smaller than the threshold R2. By this, the present embodiment can lower the average measuring frequency, while reducing the probability that the difference between the received power Qb and the received power Qa may exceed the threshold R1.

Third Embodiment

The third embodiment of the present invention will now be described with reference to the drawings. As with the first embodiment, the adjacent carrier frequency interference avoiding method for cellular system of the third embodiment is configured as shown in FIG. 1. This embodiment is applied to cellular systems using the CDMA (Code Division Multiple Access) for radio access technology. FIG. 2 shows the arrangement of carrier frequencies on the frequency axis. The arrangement of carrier frequencies assigned to each cellular system is also the same as the first embodiment.

The mobile station of the third embodiment is configured as shown in FIG. 3, similarly to the first embodiment. Its operation is the same as the mobile station of the first embodiment, except for the controlling part 304. The base station controller of the third embodiment is configured as shown in FIG. 16, also similarly to the first embodiment. Its operation is the same as the base station controller of the first embodiment, except for the controlling part 1601.

Similarly to the first embodiment, the mobile station 21 measures the received power Qa of the downlink carrier frequency from a near-by base station belonging to Cellular System A. It also measures the received power Qb of the downlink carrier frequency from a base station belonging to Cellular System B.

In the third embodiment as well, the base station 11 and the mobile station 21 start communication by using Fa3 as uplink carrier frequency and Ga3 as downlink carrier frequency. Between the base station 61 and the mobile station 71 of Cellular System B, it will be assumed that Fb1 is used as uplink carrier frequency and Gb1 as downlink carrier frequency.

The base station controller 51 changes the level of the maximum transmitting power of the mobile station 21, based on the measurement information on the received power Qa and/or Qb sent from the mobile station 21.

In one approach, the base station controller 51 pre-determines the upper limit of the transmitting power of a mobile station. If the receiving power Qb exceeds a pre-determined threshold, the base station controller 51 sets the maximum transmitting power to a value obtained by subtracting the surplus from the upper limit of the transmitting power. In another approach, if the difference between the received power Qb and the received power Qa exceeds a pre-determined threshold, the base station controller 51 sets the maximum transmitting power to a value obtained by subtracting the surplus from the upper limit of the transmitting power.

The third embodiment employs the second approach. That is, if the difference between the received power Qb and the received Power Qa is greater than the predetermined threshold while Cellular System A is using a carrier frequency adjacent to the carrier frequencies of Cellular System B, then the maximum transmitting power of the mobile station is decreased in order to avoid adjacent frequency interference.

The operation of the mobile station 21 and the base station controller 51, which employ the adjacent carrier frequency interference avoiding method of the third embodiment will now be described with reference to FIGS. 8 and 9.

Figure 8:
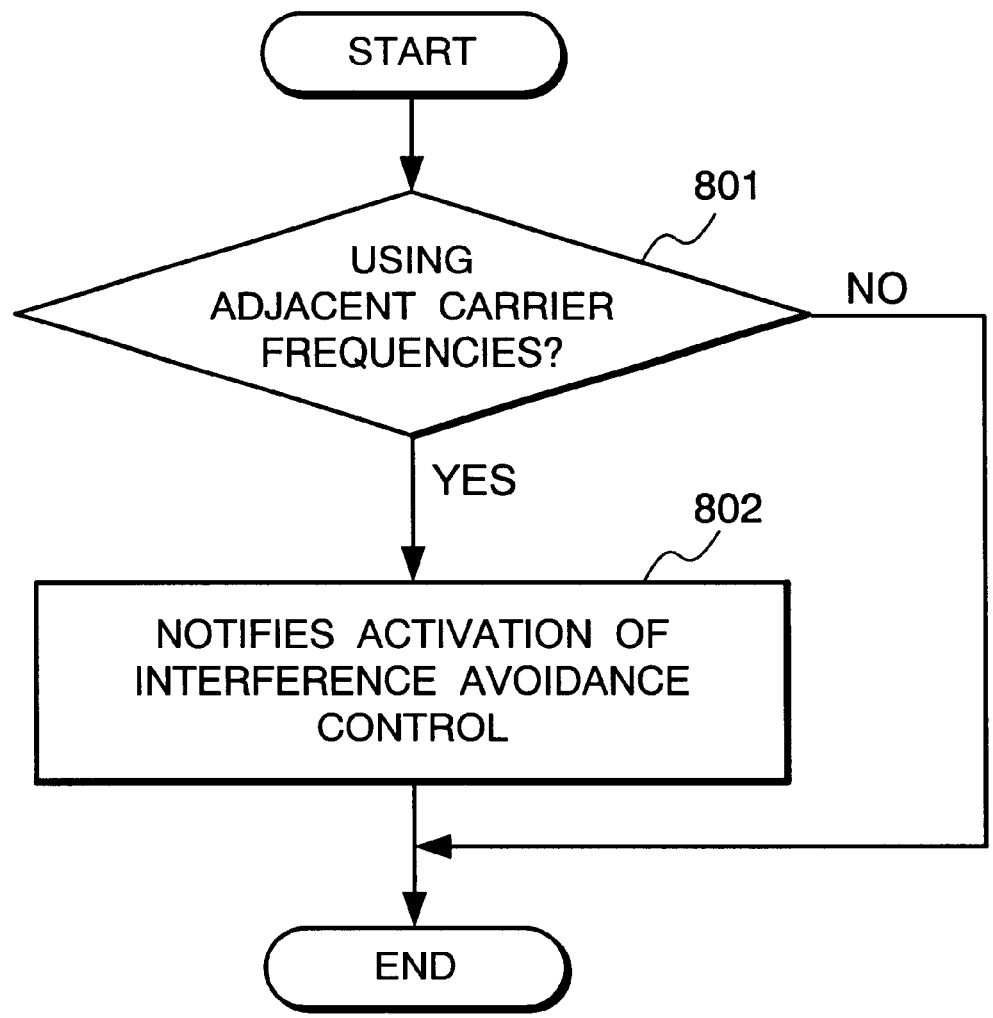
FIG. 8 is a flow chart showing the operation of a base station controller according to the third embodiment.
Figure 9:
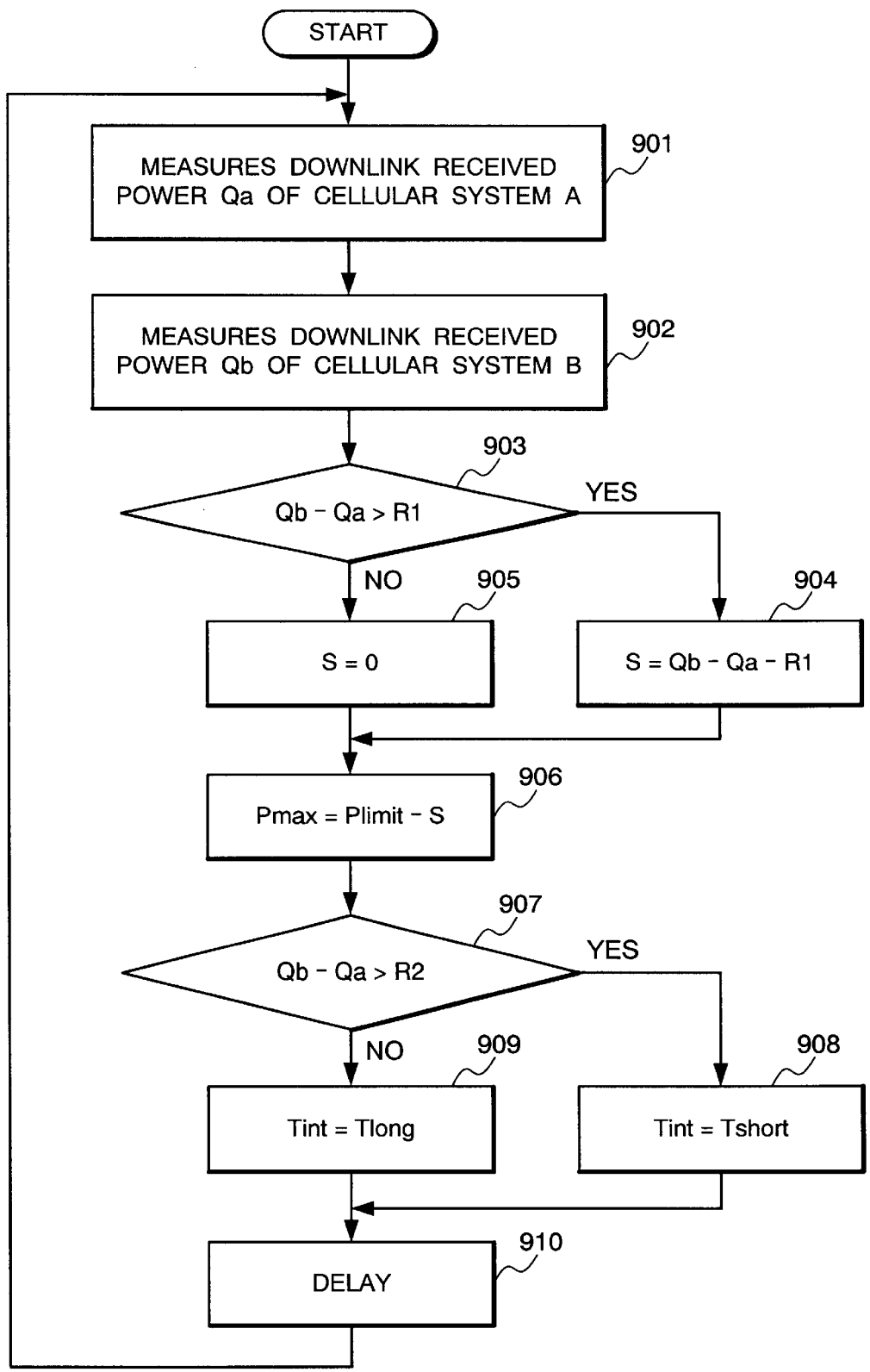
FIG. 9 is a flow chart showing the operation of a mobile station according to the third embodiment.

FIG. 8 is a flow chart showing the operation of the base station controller 51 when performing control for avoiding interference. FIG. 9 is a flow chart showing the operation of the mobile station 21 when performing control for avoiding interference.

The operation of the base station controller 51 will first be described with reference to FIG. 8. After determining the carrier frequency to be used by the mobile station 21 and starting communication, the base station controller 51 checks whether the carrier frequency is adjacent to the carrier frequencies of Cellular System B or not (Step 801). If not, it terminates without performing interference avoidance control.

If it finds that the carrier frequency being used by the mobile station 21 is adjacent to the carrier frequencies of Cellular System B, then the base station controller 51 notifies the mobile station 21 that interference avoidance control has been activated (Step 802). Along with this information, the base station controller 51 notifies the thresholds R1 and R2 as well as measurement cycle Tshort and Tlong to be used by the mobile station for interference avoidance control. It also notifies the upper limit of transmitting power Plimit and the lower limit of the maximum transmitting power.

Next, the operation of the mobile station 21 will be described with reference to FIG. 9. Upon receiving a notification of the activation of interference avoidance control from the base station controller 51, the controlling part 304 of the mobile station 21 begins the process of interference avoidance control, as described below.

Using the receiving circuit 303, the mobile station 21 measures the received power Qa of the carrier frequency Ga3 of Cellular System A (Step 901). The mobile station 21 also uses the receiving circuit 303 to measure the received power Qb of the carrier frequency Gb1 of Cellular System B (Step 902).

In Step 903, if it finds that the difference between the received power Qb and the received power Qa is greater than the pre-determined threshold R1, the mobile station 21 calculates the surplus S (Step 904). Otherwise, the mobile station 21 sets the surplus S to 0 (Step 905). It then sets the maximum transmitting power Pmax to a value equaling the upper limit of transmitting power Plimit, less the surplus S (Step 906).

When determining this value, it will be ensured that the maximum transmitting power Pmax will not be below the lower limit of the maximum transmitting power. The controlling part 304 of the mobile station 21 then sets the transmitting power from the transmitting circuit 305 so that it will not exceed the maximum transmitting power Pmax.

If, in Step 907, it finds that the difference between the received power Qb and the received power Qa is greater than the pre-determined threshold R2, the mobile station 21 sets Tint, the measuring cycle for the received power Qa and Qb, to Tshort, the short measuring cycle (Step 908). Otherwise it sets the measuring cycle Tint to Tlong, the measuring cycle longer than Tshort (Step 909). After the elapse of the delay time for the measuring cycle Tint (Step 910), the mobile station 21 repeats the same procedure, beginning with Step 901.

The thresholds R1 and R2 for use in the process of interference avoidance control described above are set in a manner similar to the first embodiment.

In the present embodiment, similarly to the first embodiment, a longer measuring cycle, Tlong, is used when the difference between the received power Qb and the received power Qa is equal to or smaller than the threshold R2. By this, the present embodiment can lower the average measuring frequency, while reducing the probability that the difference between the received power Qb and the received power Qa may exceed the threshold R1.

Fourth Embodiment

The fourth embodiment of the present invention will now be described with reference to the drawings. Remember that, in the third embodiment, the maximum transmitting power of a mobile station and the measuring cycle Tint are updated by the mobile station on an autonomous basis. The adjacent carrier frequency interference avoiding method for cellular system of the fourth embodiment is the same as the method of the third embodiment, except that the base station controller 51 performs the updating process for these values. The mobile station of the fourth embodiment also operates similarly to that of the third embodiment, except for the controlling part 304 of the mobile station 21, which handles the differing portion of the procedure.

When updating the maximum transmitting power and the measuring cycle Tint, the base station controller 51 relies on the measurement information on the received power Qa and/or Qb sent from the mobile station 21. The mobile station 21, therefore, must inform the measurement information it has obtained to the base station controller 51. In one approach, the mobile station 21 informs the measurements of the received power Qa and/or the received power Qb. In another approach, the mobile station 21 informs the difference between the received power Qb and the received power Qa. The fourth embodiment employs the first approach, in which the measurements of both the received power Qb and the received power Qa are notified.

The operation of the mobile station 21 and the base station controller 51, which employ the adjacent carrier frequency interference avoiding method of the fourth embodiment, will now be described with reference to FIGS. 10 and 11.

Figure 10:
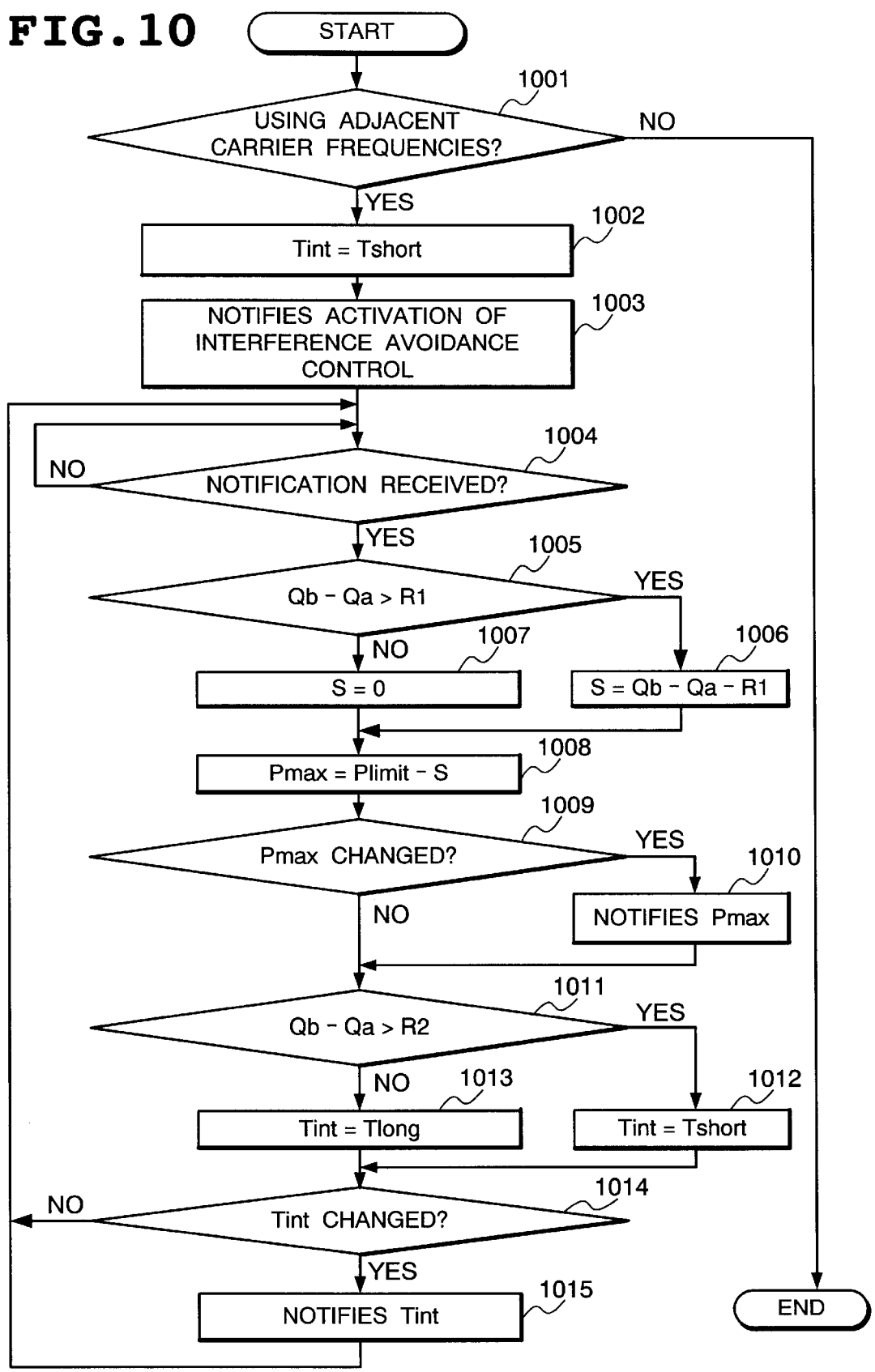
FIG. 10 is a flow chart showing the operation of a base station controller according to the fourth embodiment.
Figure 11:
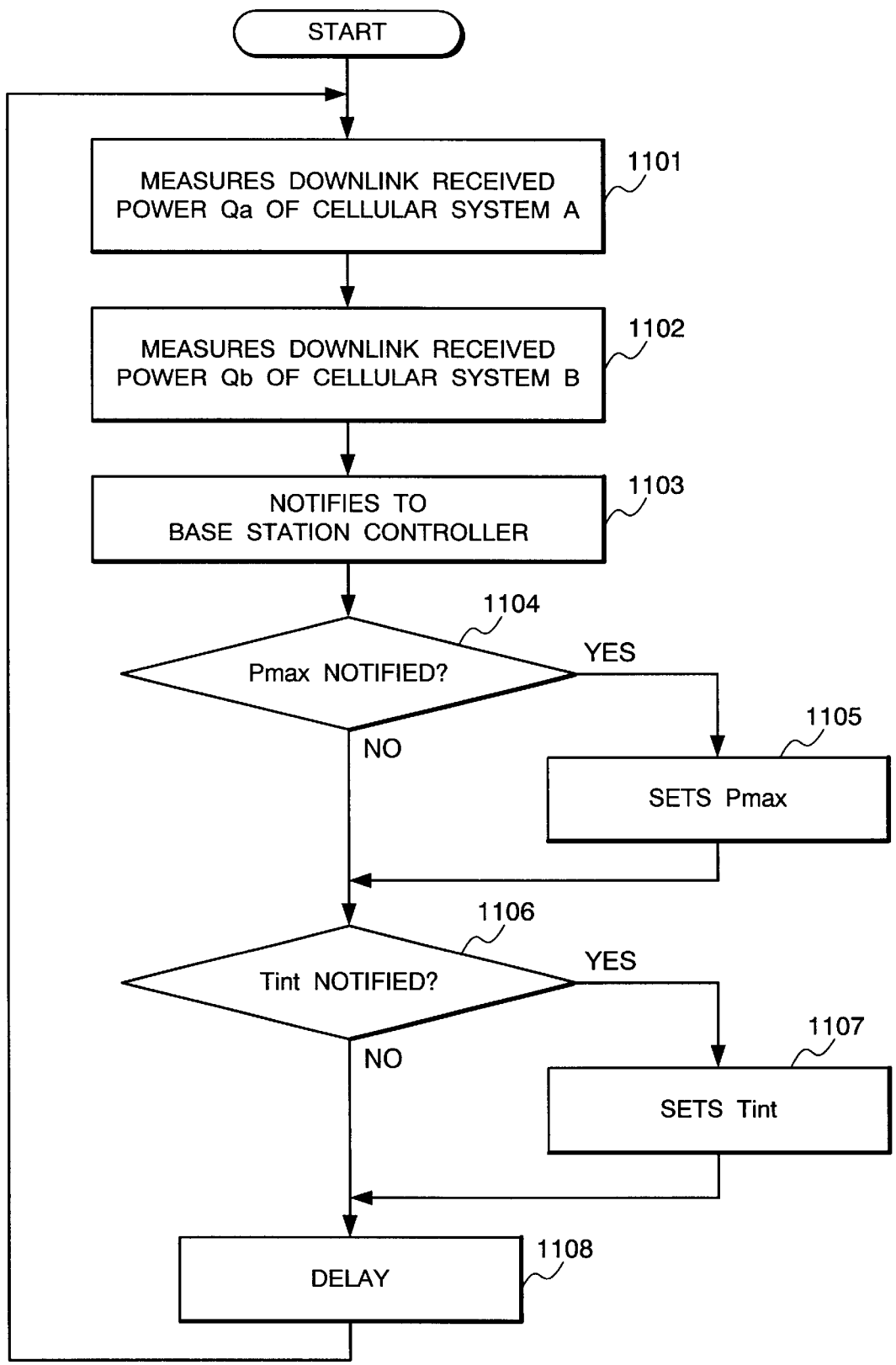
FIG. 11 is a flow chart showing the operation of a mobile station according to the fourth embodiment.

FIG. 10 is a flow chart showing the operation of the base station controller 51 when performing interference avoidance control. FIG. 11 is a flow chart showing the operation of the mobile station 21 when performing interference avoidance control.

The operation of the base station controller 51 will first be described with reference to FIG. 10. After determining the carrier frequency to be used by the mobile station 21 and starting communication, the base station controller 51 checks whether the carrier frequency is adjacent to the carrier frequencies of Cellular System B or not (Step 1001). If not, it terminates without performing interference avoidance control.

If it finds that the carrier frequency being used by the mobile station 21 is adjacent to the carrier frequencies of Cellular System B, then the base station controller 51 sets Tint, the cycle for measuring the received power of the carrier frequency in the downlink from the mobile station for interference avoidance control, to Tshort, the short measuring cycle (Step 1002). The base station controller 51 then notifies the mobile station 21 that interference avoidance control has been activated, together with the information on the measuring cycle Tint (Step 1003).

After it starts interference avoidance control, the mobile station 21 measures the downlink received power Qa of Cellular System A and the downlink received power Qb of Cellular System B, and notifies the resulting measurements to the base station controller 51. Upon receiving the notification (Step 1004), the base station controller 51 proceeds to Step 1005. In Step 1005, if it finds that the difference between the received power Qb and the received power Qa is greater than the pre-determined threshold R1, the mobile station 21 calculates the surplus S (Step 1006). Otherwise, the mobile station 21 sets the surplus S to 0 (Step 1007).

It then sets the maximum transmitting power Pmax to a value equaling the upper limit of transmitting power Plimit, less the surplus S (Step 1008). If the maximum transmitting power Pmax has been changed in Step 1007 or 1008, the base station controller 51 notifies the new maximum transmitting power Pmax to the mobile station 21 (Step 1010).

If it finds that the difference between the received power Qb and the received power Qa is greater than the pre-determined threshold R2, the base station controller 51 sets Tint, the measuring cycle for the received power Qa and Qb, to Tshort, the short measuring cycle (Step 1012). Otherwise it sets the measuring cycle Tint to Tlong, the measuring cycle longer than Tshort (Step 1013). If the control cycle Tint has been changed in Step 1012 or 1013, the base station controller 51 notifies the new control cycle Tint to the mobile station 21 (Step 1015), and repeats the procedure from Step 1004. Otherwise, it repeats the procedure from Step 1004, without notifying the control cycle Tint.

The thresholds R1 and R2 for use in the process of interference avoidance control described above are set in a manner similar to the third embodiment.

Next, the operation of the mobile station 21 will be described with reference to FIG. 11. Upon receiving a notification of the activation of interference avoidance control from the base station controller 51, the controlling part 304 of the mobile station 21 begins the process of interference avoidance control, as described below.

Using the receiving circuit 303, the mobile station 21 measures the received power Qa of the carrier frequency Ga3 of Cellular System A (Step 1101). The mobile station 21 also uses the receiving circuit 303 to measure the received power Qb of the carrier frequency Gb1 of Cellular System B (Step 1102).

It then generates control information to notify the measurements of the received power Qa and Qb, and uses the transmitting circuit 305 to transmit the control information to the base station 11. The base station 11 in turn notifies the same control information to the base station controller 51 (Step 1103). In Step 1104, the mobile station 21 checks for a notification of the maximum transmitting power Pmax from the base station controller 51 (Step 1104). If there is one, it sets the maximum transmitting power Pmax to the value designated in the notification (Step 1105).

The controlling part 304 of the mobile station 21 sets the transmitting power from the transmitting circuit 305 so that it will not exceed the maximum transmitting power Pmax. The mobile station 21 further checks for a notification of the control cycle Tint (Step 1106). If there is one, it sets the control cycle Tint to the value designated in the notification (Step 1107). After the elapse of the delay time for the control cycle Tint (Step 1108), the mobile station 21 repeats the same procedure, beginning with Step 1101.

In the present embodiment, similarly to the third embodiment, a longer measuring cycle, Tlong, is used when the difference between the received power Qb and the received power Qa is equal to or smaller than the threshold R2. By this, the present embodiment can lower the average measuring frequency, while reducing the probability that the difference between the received power Qb and the received power Qa may exceed the threshold R1.

Fifth Embodiment

The fifth embodiment of the present invention will now be described with reference to the drawings. Remember that, in the third embodiment, both the maximum transmitting power of a mobile station and the measuring cycle Tint are determined by the mobile station on an autonomous basis. In the adjacent carrier frequency interference avoiding method for cellular system of the fifth embodiment, the maximum transmitting power of a mobile station is determined by the mobile station, but the measuring cycle Tint is determined by the base station controller 51. The rest of the fifth method is the same as the method of the third embodiment. The mobile station of the fifth embodiment also operates similarly to that of the third embodiment, except for the controlling part 304, which handles the differing portion of the procedure.

When updating the maximum transmitting power and the measuring cycle Tint, the base station controller 51 relies on the measurement information on the received power Qa and/or Qb sent from the mobile station 21. The mobile station 21, therefore, must inform the measurement information it has obtained to the base station controller 51. In one approach, the mobile station 21 informs the measurements of the received power Qa and/or the received power Qb. In another approach, the mobile station 21 informs the difference between the received power Qb and the received power Qa. The fifth embodiment employs the first approach, in which the measurements of both the received power Qb and the received power Qa are notified.

The operation of the mobile station 21 and the base station controller 51, which employ the adjacent carrier frequency interference avoiding method of the fifth embodiment, will now be described with reference to FIGS. 12 and 13.

Figure 12:
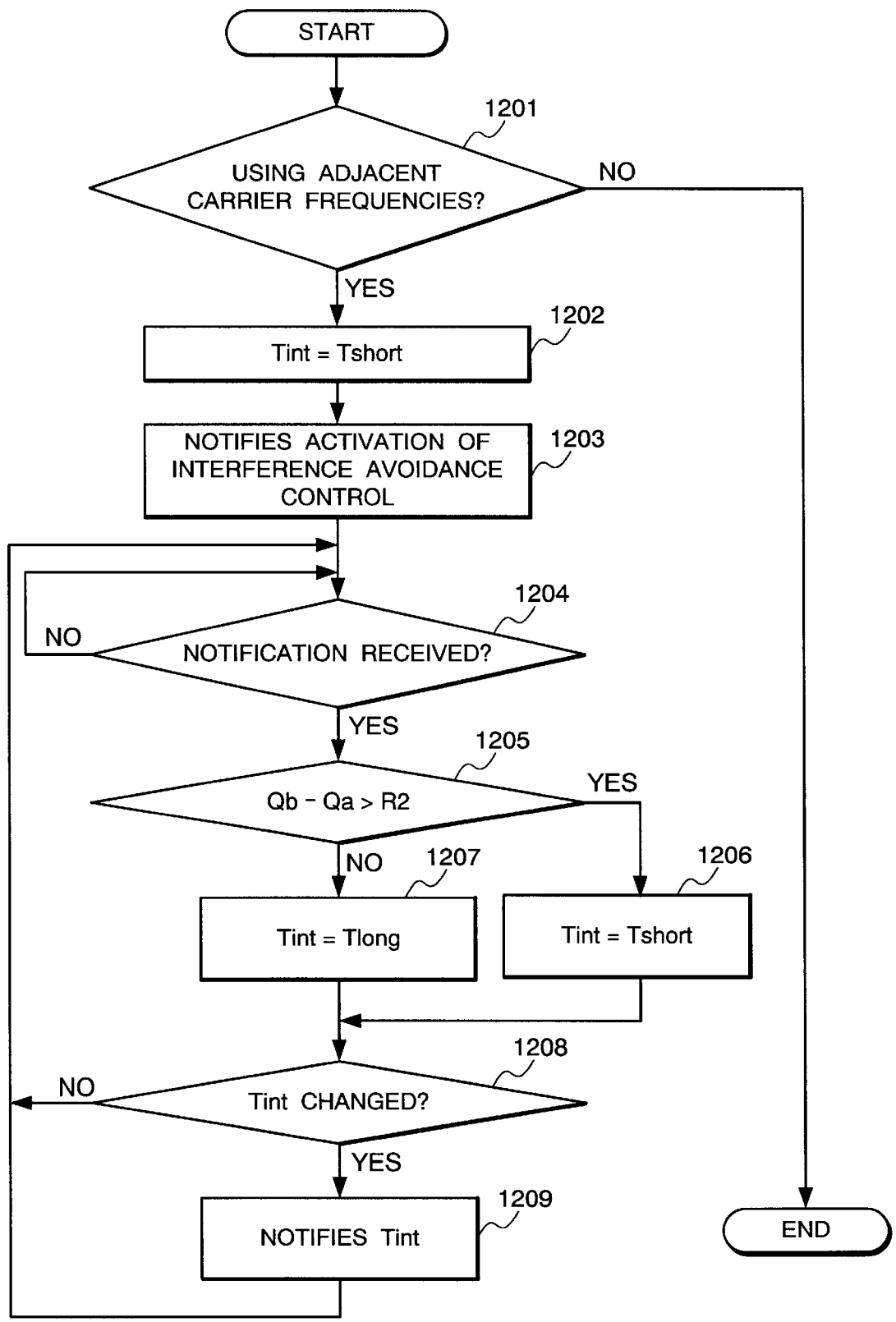
FIG. 12 is a flow chart showing the operation of a base station controller according to the fifth embodiment.
Figure 13:
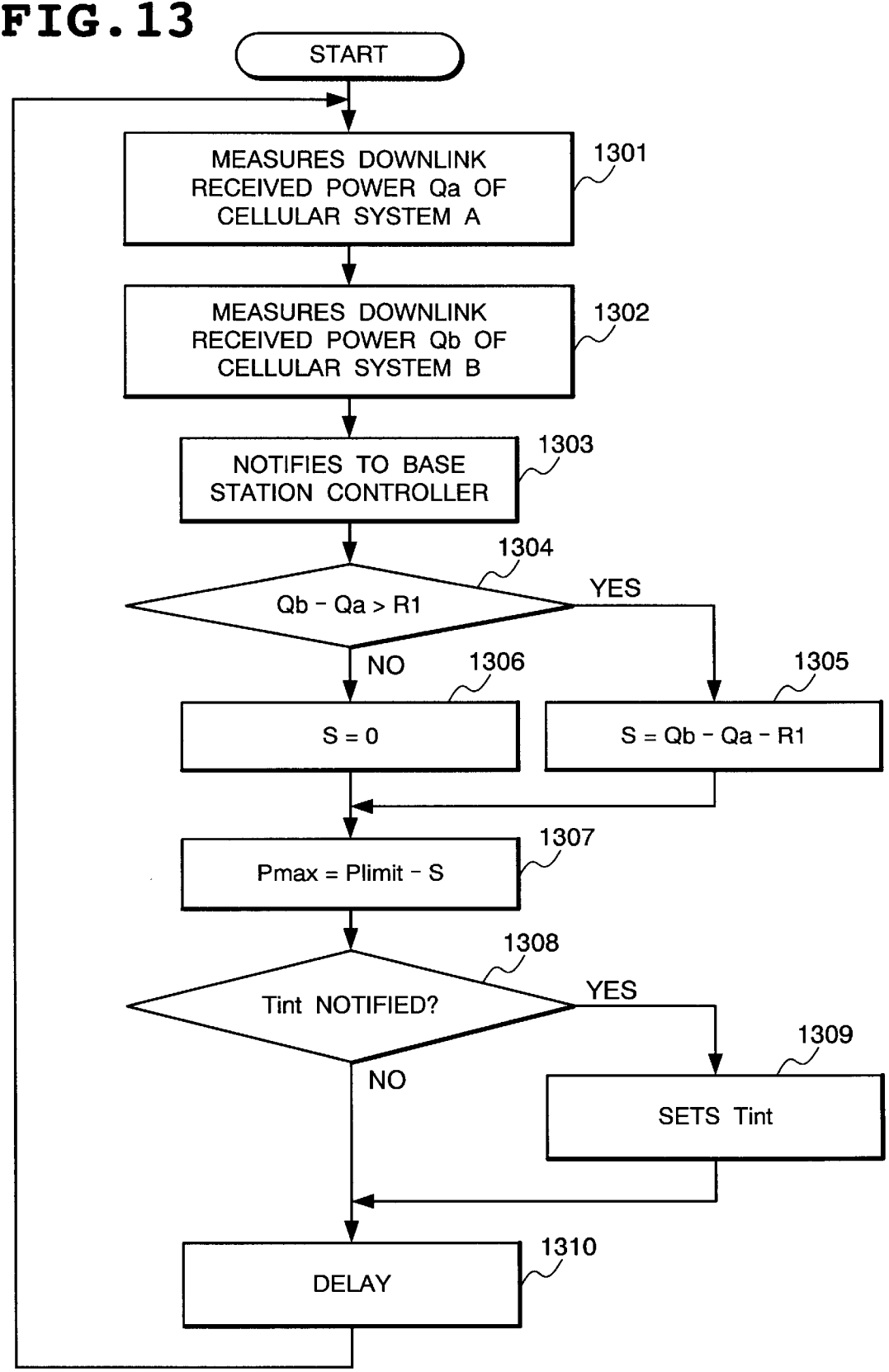
FIG. 13 is a flow chart showing the operation of a mobile station according to the fifth embodiment.

FIG. 12 is a flow chart showing the operation of the base station controller 51 when performing interference avoidance control. FIG. 13 is a flow chart showing the operation of the mobile station 21 when performing interference avoidance control.

The operation of the base station controller 51 will first be described with reference to FIG. 12. After determining the carrier frequency to be used by the mobile station 21 and starting communication, the base station controller 51 checks whether the carrier frequency is adjacent to the carrier frequencies of Cellular System B or not (Step 1201). If not, it terminates without performing interference avoidance control.

If it finds that the carrier frequency being used by the mobile station 21 is adjacent to the carrier frequencies of Cellular System B, then the base station controller 51 sets Tint, the cycle for measuring the received power of the carrier frequency of the downlink from the mobile station for interference avoidance control, to Tshort, the short measuring cycle (Step 1202). The base station controller 51 then notifies the mobile station 21 that interference avoidance control has been activated (Step 1203). Along with this information, the base station controller 51 notifies the measuring cycle Tint, the threshold R1 for use by the mobile station for interference avoidance control, the upper limit of the maximum transmitting power Plimit, and the lower limit of the maximum transmitting power.

After it starts interference avoidance control, the mobile station 21 measures the downlink received power Qa of Cellular System A and the downlink received power Qb of Cellular System B, and notifies the resulting measurements to the the base station controller 51. Upon receiving the notification (Step 1204), the base station controller 51 proceeds to Step 1205. If, in Step 1205, it finds that the difference between the received power Qb and the received power Qa is greater than the pre-determined threshold R2, the base station controller 51 sets Tint, the measuring cycle for the received power Qa and Qb, to Tshort, the short measuring cycle (Step 1206). Otherwise it sets the measuring cycle Tint to Tlong, the measuring cycle longer than Tshort (Step 1207). If the control cycle Tint has been changed in Step 1206 or 1207, the base station controller 51 notifies the new control cycle Tint to the mobile station 21 (Step 1209), and repeats the procedure from Step 1204. Otherwise, it repeats the procedure from Step 1204 without notifying the control cycle Tint.

Next, the operation of the mobile station 21 will be described with reference to FIG. 13. Upon receiving a notification of the activation of interference avoidance control from the base station controller 51, the controlling part 304 of the mobile station 21 begins the process of interference avoidance control, as described below.

Using the receiving circuit 303, the mobile station 21 measures the received power Qa of the carrier frequency Ga3 of Cellular System A (Step 1301). The mobile station 21 also uses the receiving circuit 303 to measure the received power Qb of the carrier frequency Gb1 of Cellular System B (Step 1302).

It then generates control information to notify the measurements of the received power Qa and Qb, and uses the transmitting circuit 305 to transmit the control information to the base station 11. The base station 11 in turn notifies the same control information to the base station controller 51 (Step 1303).

In Step 1304, if it finds that the difference between the received power Qb and the received power Qa is greater than the pre-determined threshold R1, the mobile station 21 calculates the surplus S (Step 1305). Otherwise, the mobile station 21 sets the surplus S to 0 (Step 1306).

It then sets the maximum transmitting power Pmax to a value equaling the upper limit of transmitting power Plimit, less the surplus S (Step 1307). When determining this value, it will be ensured that the maximum transmitting power Pmax will not be below the lower limit of the maximum transmitting power.

The controlling part 304 of the mobile station 21 then sets the transmitting power from the transmitting circuit 305 so that it will not exceed the maximum transmitting power Pmax. The mobile station 21 further checks for a notification of the control cycle Tint (Step 1308). If there is one, it sets the control cycle Tint to the value designated in the notification (Step 1309). After the elapse of the delay time for the control cycle Tint (Step 1310), the mobile station 21 repeats the same procedure, beginning with Step 1301.

The thresholds R1 and R2 for use in the process of interference avoidance control described above are set in a manner similar to the third embodiment.

In the present embodiment, similarly to the third embodiment, a longer measuring cycle, Tlong, is used when the difference between the received power Qb and the received power Qa is equal to or smaller than the threshold R2. By this, the present embodiment can lower the average measuring frequency, while reducing the probability that the difference between the received power Qb and the received power Qa may exceed the threshold R1.

Sixth Embodiment

The sixth embodiment of the present invention will now be described with reference to the drawings. Remember that, in the third embodiment, both the maximum transmitting power of a mobile station and the measuring cycle Tint are determined by the mobile station on an autonomous basis. In the adjacent carrier frequency interference avoiding method for cellular system of the sixth embodiment, the measuring cycle Tint is determined by the mobile station, but the maximum transmitting power of a mobile station is determined by the base station controller 51. The rest of the sixth method is the same as the method of the third embodiment. The mobile station of the sixth embodiment also operates similarly to that of the third embodiment, except for the controlling part 304 of the mobile station 21, which handles the differing portion of the procedure.

The base station controller 51 relies on the measurement information on the received power Qa and/or Qb sent from the mobile station 21 to update the maximum transmitting power. The mobile station 21, therefore, must inform the measurement information it has obtained to the base station controller 51. In one approach, the mobile station 21 informs the measurements of the received power Qa and/or the received power Qb. In another approach, the mobile station 21 informs the difference between the received power Qb and the received power Qa. The fifth embodiment employs the first approach, in which the measurements of both the received power Qb and the received power Qa are notified.

The operation of the mobile station 21 and the base station controller 51, which employ the adjacent carrier frequency interference avoiding method of the sixth embodiment, will now be described with reference to FIGS. 14 and 15.

Figure 14:
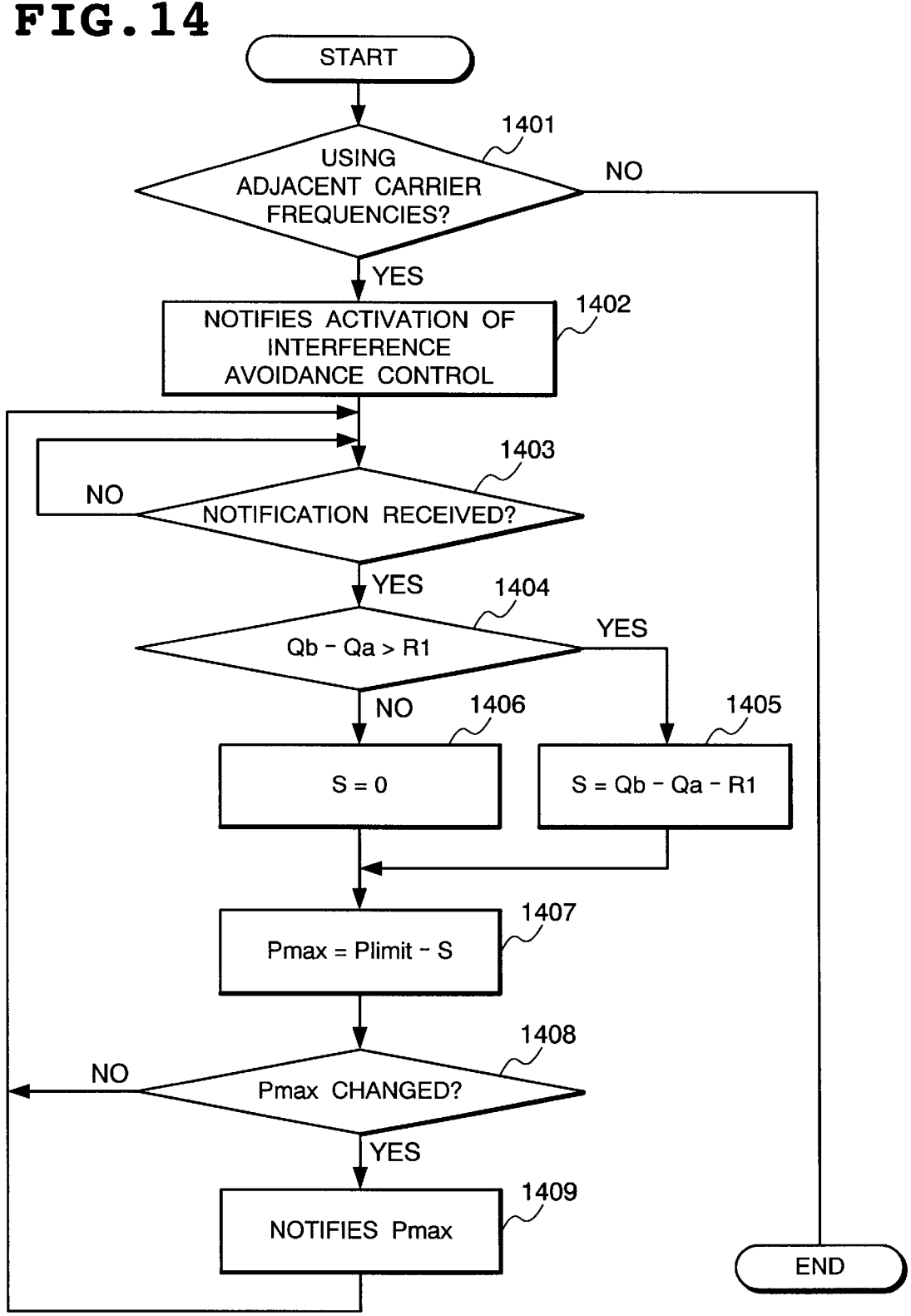
FIG. 14 is a flow chart showing the operation of a base station controller according to the sixth embodiment.
Figure 15:
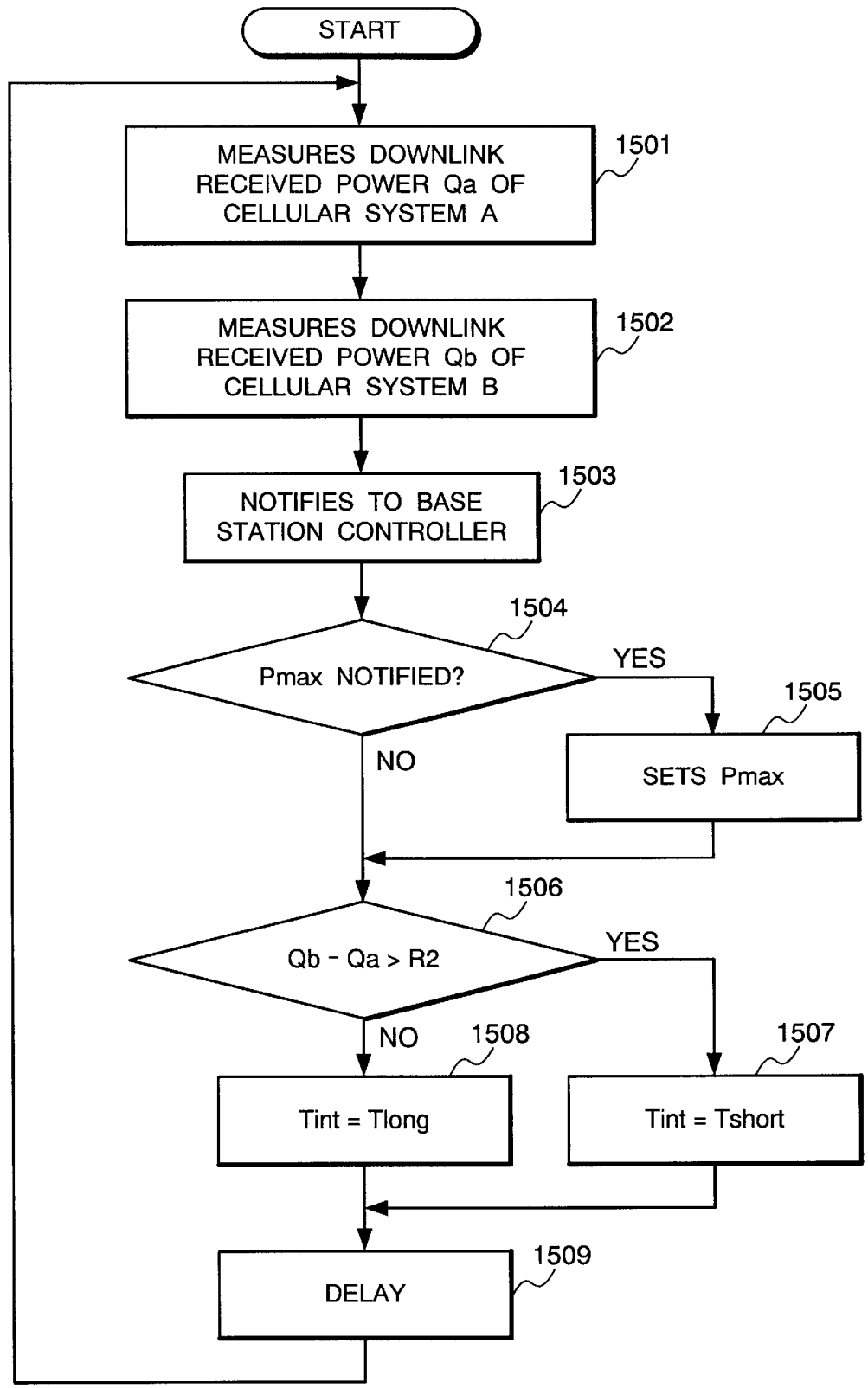
FIG. 15 is a flow chart showing the operation of a mobile station according to the sixth embodiment.

FIG. 14 is a flow chart showing the operation of the base station controller 51 when performing interference avoidance control. FIG. 15 is a flow chart showing the operation of the mobile station 21 when performing interference avoidance control.

The operation of the base station controller 51 will first be described with reference to FIG. 14. After determining the carrier frequency to be used by the mobile station 21 and starting communication, the base station controller 51 checks whether the carrier frequency is adjacent to the carrier frequencies of Cellular System B or not (Step 1401). If not, it terminates without performing interference avoidance control.

If it finds that the carrier frequency being used by the mobile station 21 is adjacent to the carrier frequencies of Cellular System B, then the base station controller 51 notifies the mobile station 21 that interference avoidance control has been activated (Step 1402). Along with this information, the base station controller 51 notifies the thresholds R2 for use by the mobile station for interference avoidance control, and the measuring cycles Tshort and Tlong.

After it starts interference avoidance control, the mobile station 21 measures the downlink received power Qa of Cellular System A and the downlink received power Qb of Cellular System B, and notifies the resulting measurements to the base station controller 51. Upon receiving the notification (Step 1403), the base station controller 51 proceeds to Step 1404. In Step 1404, if it finds that the difference between the received power Qb and the received power Qa is greater than the pre-determined threshold R1, the mobile station 21 calculates the surplus S (Step 1405). Otherwise, the mobile station 21 sets the surplus S to 0 (Step 1406).

It then sets the maximum transmitting power Pmax to a value equaling the upper limit of transmitting power Plimit, less the surplus S (Step 1407). If the maximum transmitting power Pmax has been changed in Step 1405 or 1406, the base station controller 51 notifies the new maximum transmitting power Pmax to the mobile station 21 (Step 1409), and repeats the procedure from Step 1403. Otherwise, it repeats the procedure from Step 1403, without notifying the maximum transmitting power Pmax.

Next, the operation of the mobile station 21 will be described with reference to FIG. 15. Upon receiving a notification of the activation of interference avoidance control from the base station controller 51, the controlling part 304 of the mobile station 21 begins the process of interference avoidance control, as described below.

Using the receiving circuit 303, the mobile station 21 measures the received power Qa of the carrier frequency Ga3 of Cellular System A (Step 1501). The mobile station 21 also uses the receiving circuit 303 to measure the received power Qb of the carrier frequency Gb1 of Cellular System B (Step 1502). It then generates control information to notify the measurements of the received power Qa and Qb, and uses the transmitting circuit 305 to transmit the control information to the base station 11. The base station 11 in turn notifies the same control information to the base station controller 51 (Step 1503). In Step 1504, the mobile station 21 checks for a notification of the maximum transmitting power Pmax (Step 1504). If there is one, it sets the maximum transmitting power Pmax to the value designated in the notification (Step 1505).

The controlling part 304 of the mobile station 21 sets the transmitting power from the transmitting circuit 305 so that it will not exceed the maximum transmitting power Pmax. If, in Step 1506, it finds that the difference between the received power Qb and the received power Qa is greater than the pre-determined threshold R2, the mobile station 21 sets Tint, the measuring cycle for the received power Qa and Qb, to Tshort, the short measuring cycle (Step 1507). Otherwise it sets the measuring cycle Tint to Tlong, the measuring cycle longer than Tshort (Step 1508). After the elapse of the delay time for the measuring cycle Tint (Step 1509), the mobile station 21 repeats the same procedure, beginning with Step 1501.

The thresholds R1 and R2 for use in the process of interference avoidance control described above are set in a manner similar to the third embodiment.

In the present embodiment, similarly to the third embodiment, a longer measuring cycle, Tlong, is used when the difference between the received power Qb and the received power Qa is equal to or smaller than the threshold R2. By this, the present embodiment can lower the average measuring frequency, while reducing the probability that the difference between the received power Qb and the received power Qa may exceed the threshold R1.

In each of the embodiments described above, Cellular System A and Cellular System B have multiple base stations connected to one base station controller, respectively. It should be noted, however, each of the base stations may be provided with one base station controller. In this case, a base station controller may be configured in a base station as an integral part of the base station.

In the embodiments above, the information used by a mobile station for interference avoidance control, i.e., the thresholds R1 and R2, the measuring cycles Tshort and Tlong, and the upper and lower limits of the transmitting power from the mobile station, are notified separately by the base station controller to the mobile station at the beginning of interference avoidance control. It should also be noted that a base station may inform all or part of these pieces of information, using a common control channel for shared use by all mobile stations, for each mobile station to receive and set in advance.

According to the present invention, it is possible to reduce the frequency of measurements of the received power of a carrier frequency, which must be conducted by a mobile station in reducing interference between adjacent carrier frequencies, for use when changing the carrier frequency or changing the maximum transmitting power from the mobile station, depending on the resulting measurements. By this, the frequency of increasing the transmitting power from a base station for increased information transmission rate can be reduced, which is important for mobile stations of a type that can receive only one carrier frequency, Accordingly, the present invention can provide the effect of preventing an increase in interference of downlink with other channels and consequently of saving link capacity. Furthermore, in cases where fast closed-loop transmitter power control, which updates the transmitting power from a mobile station through control signals sent from a base station in very short cycles, is conducted, the frequency of interrupting such control can be reduced. This further provides the effect of reducing the possibilities that communication quality may be deteriorated due to a shortage of signal power in uplink channels and that interference may be increased due to excessive signal power in channels, which in turn produces the effect of further saving link capacity. Finally, the reduced measuring frequency contributes to a reduction in total power consumption of a mobile station during measurement.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An adjacent carrier frequency interference avoiding method, for use in a first cellular system including a base station and a mobile station when the mobile station is located in the service areas of the first cellular system and a second cellular system which uses a frequency band adjacent on the frequency axis to the frequency band being used by the first cellular system, said method comprising:

at the mobile station measuring the received power of the carrier frequencies being transmitted from the base station of the first cellular system and the received power of the carrier frequencies being used by the second cellular system;

based on a result of the measuring of the received power, assigning a carrier frequency for communication between the mobile station and the base station of the first cellular system that is not adjacent on the frequency axis to the carrier frequencies being used by the second cellular system; and based on the result of the measuring of the received power, changing the frequency of measuring of the received power.

2. The adjacent carrier frequency interference avoiding method for cellular system as set forth in claim 1, wherein:

the carrier frequency is assigned when the difference between the power received at the mobile station from the base station of the first cellular system and the power received at the mobile station from the second cellular system is greater than a first threshold.

3. The adjacent carrier frequency interference avoiding method for cellular system as set forth in claim 1, wherein:

the frequency of the measuring of the received power is changed when the difference between the power received at the mobile station from the base station of the first cellular system and the power received at the mobile station from the second cellular system is greater than a second threshold.

4. An adjacent carrier frequency interference avoiding method, for use in a first cellular system including a base station and a mobile station, when the mobile station is located in the service areas of the first cellular system and a second cellular system which uses a frequency band adjacent on the frequency axis to the frequency band being used by the first cellular system, said method comprising at the mobile station measuring the received power of the carrier frequencies being transmitted from the base station of the first cellular system and the received power of the carrier frequencies being used by the second cellular system;

based on a result of the measuring of the received power, adjusting the maximum power of the carrier frequencies used for communication from the mobile station to the base station of the first cellular system; and based on the result of the measuring of the received power, changing the frequency of measuring of the received power.

5. The adjacent carrier frequency interference avoiding method for cellular system as set forth in claim 4, wherein:

the maximum power from said mobile station is adjusted when the difference between the power received at the mobile station from the base station of the first cellular system and the power received at the mobile station from the second cellular system is greater than a predetermined threshold.

6. The adjacent carrier frequency interference avoiding method for cellular system as set forth in claim 4, wherein:

the frequency of the measuring of the received power is changed when the difference between the power received at the mobile station from the base station of the first cellular system and the power received at the mobile station from the second cellular system is greater than a predetermined threshold.

7. A mobile station for use in a first cellular system which includes a base station and the mobile station, the mobile station being located in the service areas of the first cellular system and a second cellular system which uses a frequency band adjacent on the frequency axis to the frequency band being used by the first cellular system, said mobile station comprising:

a power measuring unit for measuring the received power of the carrier frequencies being transmitted from the base station of the first cellular system and the received power of the carrier frequencies being used by the second cellular system;

a communication unit for reporting information on the results of the measuring of the received power to the base station of the first cellular system;

a carrier frequency changing unit responsive to a notification from the base station of the first cellular system for changing the carrier frequencies used for communication between the mobile station and the base station of the first cellular system; and a measuring frequency changing unit for changing the frequency of measuring of the received power.

8. The mobile station as set forth in claim 7, wherein:

said measuring frequency changing unit changes the frequency of measuring of the received power according to the results of the measuring of the received power by the power measuring unit.

9. The mobile station as set forth in claim 7, wherein:

said measuring frequency changing unit changes the frequency of measuring of the received power according to a notification from the base station of the first cellular system.

10. The mobile station as set forth in claim 7, wherein:

the carrier frequency changing unit assigns to the mobile station carrier frequencies that are not adjacent on the frequency axis to the carrier frequencies being used by the second cellular system if the difference between the power received at the mobile station from the base station of the first cellular system and the power received at the mobile station from the second cellular system is greater than predetermined threshold.

11. The mobile station as set forth in claim 7, wherein:

the measuring frequency changing unit changes the frequency of measuring of the received power if the difference between the power received at the mobile station from the base station of the first cellular system and the power received at the mobile station from the second cellular system is greater than a predetermined threshold.

12. A mobile station for use in a first cellular system which includes a base station and the mobile station, the mobile station being located in the service areas of the first cellular system and a second cellular system which uses a frequency band adjacent on the frequency axis to the frequency band being used by the first cellular system, said mobile station comprising:

a power measuring unit for measuring the received power of the carrier frequencies being transmitted from the base station of the first cellular system and the received power of the carrier frequencies being used by the second cellular system;

a maximum power changing unit responsive to the results of the measuring of the received power for changing the maximum transmitting power of the mobile station; and a measuring frequency changing unit for changing the frequency of measuring of the received power.

13. The mobile station as set forth in claim 12, wherein the measuring frequency changing unit changes the frequency of measuring of the received power according to the results of the measuring of the received power by the power measuring unit.

14. The mobile station as set forth in claim 12, further comprising:

a communication unit for reporting information on the results of the measuring of the received power to the base station of the first cellular system;

wherein the measuring frequency changing unit changes the frequency of measuring of the received power based on a notification from the base station of the first cellular system.

15. The mobile station as set forth in claim 12, wherein:

the maximum power changing unit changes the maximum transmitting power when the difference between the power received at the mobile station from the base station of the first cellular system and the power received at the mobile station from the second cellular system is greater than a predetermined threshold.

16. The mobile station as set forth in claim 12, wherein:

said measurement frequency changing unit changes the frequency of the measuring of the received power when the difference between the power received at the mobile station from the base station of the first cellular system and the power received at the mobile station from the second cellular system is greater than a predetermined threshold.

17. A mobile station for use in a first cellular system which includes a base station and the mobile station, the mobile station being located in the service areas of the first cellular system and a second cellular system which uses a frequency band adjacent on the frequency axis to the frequency band being used by the first cellular system, said mobile station comprising:

a power measuring unit for measuring the received power of the carrier frequencies being transmitted from the base station of the first cellular system and the received power of the carrier frequencies being used by the second cellular system;

a communication unit for reporting information on the results of the measuring of the received power to the base station of the first cellular system; and a maximum power changing unit for changing the maximum transmitting power of the mobile station according to a notification from the base station of the first cellular system; and a measuring frequency changing unit for changing the frequency of measuring of the received power.

18. The mobile station as set forth in claim 17, wherein:
the measuring frequency changing unit changes the frequency of measuring of the received power according to the results of measuring of the received power by the power measuring unit.

19. The mobile station as set forth in claim 17, wherein:
the measuring frequency changing unit changes the frequency of measuring of the received power based on a notification from the base station of the first cellular system.

20. The mobile station as set forth in claim 17, wherein:
the maximum power changing unit changes the maximum transmitting power when the difference between the power received at the mobile station from the base station of the first cellular system and the power received at the mobile station from the second cellular system is greater than a first threshold.

21. The mobile station as set forth in claim 17, wherein:
the measurement frequency changing unit changes the frequency of the measuring when the difference between the power received at the mobile station from the base station of the first cellular system and the power received at the mobile station from the second cellular system is greater than a second threshold.

22. An adjacent carrier frequency interference avoiding method, for use in a first cellular system including a base station and a mobile station when the mobile station is located in the service areas of the first cellular system and a second cellular system which uses a frequency band adjacent on the frequency axis to the frequency band being used by the first cellular system, said method comprising:

at the mobile station, measuring a received power of the carrier frequencies being transmitted from the base station of the first cellular system and the received power of the carrier frequencies being used by the second cellular system;

based on a result of the measuring of the received power, adjusting the operation of the mobile station to avoid interference with the carrier frequencies of the second cellular system; and based on the result of the measuring of the received power, changing the frequency of measuring of the received power.

23. A mobile station for use in a first cellular system which includes a base station and the mobile station, the mobile station being located in the service areas of the first cellular system and a second cellular system which uses a frequency band adjacent on the frequency axis to the frequency band being used by the first cellular system, said mobile station comprising:

a power measuring unit for measuring the received power of the carrier frequencies being transmitted from the base station of the first cellular system and the received power of the carrier frequencies being used by the second cellular system;

a control unit responsive to the results of the measuring of the received power for adjusting the operation of the mobile station to avoid interference with the carrier frequencies of the second cellular system; and a measuring frequency changing unit for changing the frequency of measuring of the received power.

* * * * *